(12) United States Patent
Syrovy et al.

(10) Patent No.: US 6,402,088 B1
(45) Date of Patent: Jun. 11, 2002

(54) PASSENGER VEHICLE EMPLOYING A CIRCUMFERENTIALLY DISPOSED ROTATABLE THRUST ASSEMBLY

(75) Inventors: George J. Syrovy, Needham; Siamak Yassini-Fard, Boxford, both of MA (US); Rouzbeh Yassini-Fard, Nashua, NH (US)

(73) Assignee: Aero Copter, Inc., Andover, MA (US)

( * ) Notice: Subject to any disclaimer, the term of this patent is extended or adjusted under 35 U.S.C. 154(b) by 0 days.

(21) Appl. No.: 09/728,231

(22) Filed: Feb. 28, 2001

Related U.S. Application Data

(60) Provisional application No. 60/224,943, filed on Aug. 11, 2000, and provisional application No. 60/234,098, filed on Sep. 21, 2000.

(51) Int. Cl.$^7$ .............................................. B64C 27/22
(52) U.S. Cl. ........................... 244/10; 244/12.2; 244/8; 244/17.11; 244/21; 244/23 C
(58) Field of Search .......................... 244/6, 7 A, 7 B, 244/7 C, 8, 10, 12.2, 17.11, 17.25, 21, 23 C

(56) References Cited

U.S. PATENT DOCUMENTS

| | | | | |
|---|---|---|---|---|
| 3,599,902 A | * | 8/1971 | Thomley | 244/12.2 |
| 3,606,209 A | * | 9/1971 | Rosta et al. | 244/12.2 |
| 3,632,065 A | * | 1/1972 | Rosta | 244/17.11 |
| 3,633,849 A | * | 1/1972 | Kling | 244/12.2 |
| 4,807,830 A | * | 2/1989 | Horton | 244/12.2 |
| 5,653,404 A | * | 8/1997 | Ploshkin | 244/12.2 |

* cited by examiner

*Primary Examiner*—J. Woodrow Eldred
(74) *Attorney, Agent, or Firm*—Lahive & Cockfield, LLP

(57) ABSTRACT

A vertical take-off and landing vehicle that employs a thrust assembly, a fuselage, and an intermediate rotation decoupling interface assembly for rotationally decoupling the thrust assembly from the fuselage. The thrust assembly forms a single combined thrust force about the fuselage in order to form a more stable vehicle during flight.

290 Claims, 8 Drawing Sheets

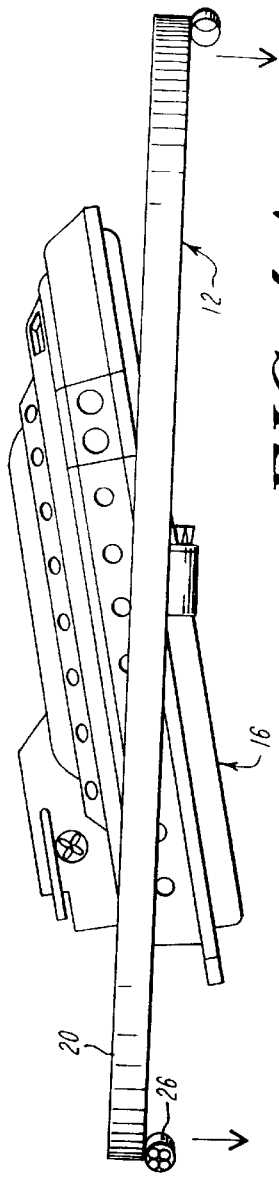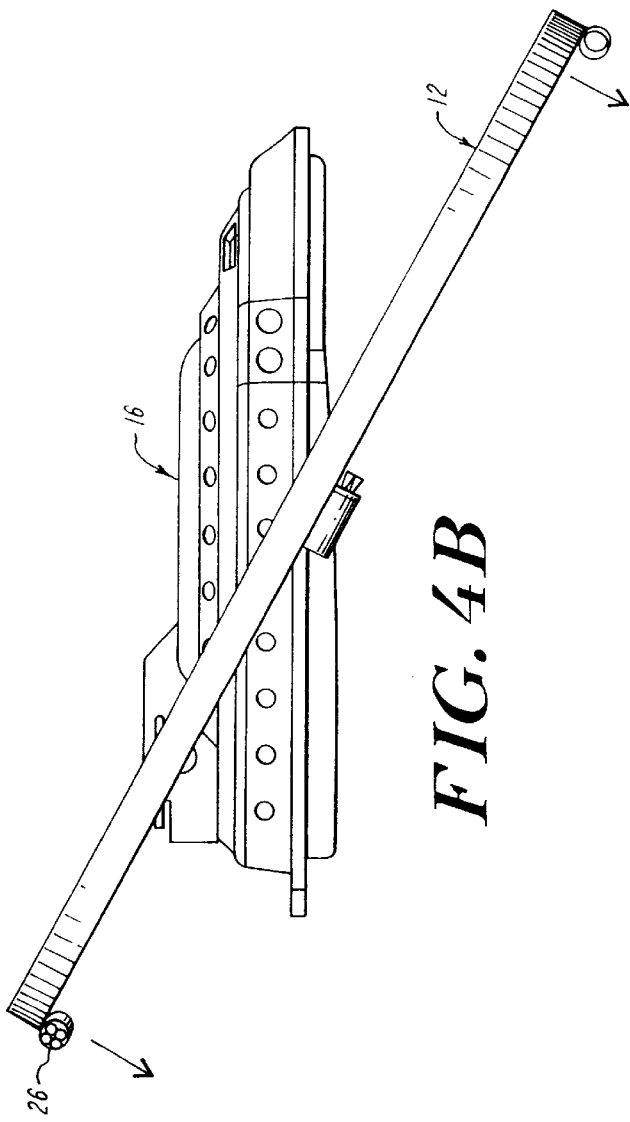
FIG. 4A
FIG. 4B

PASSENGER VEHICLE EMPLOYING A CIRCUMFERENTIALLY DISPOSED ROTATABLE THRUST ASSEMBLY

RELATED APPLICATIONS

This application is a continuation-in-part patent application of prior provisional patent application Serial No. 60/224,943, filed Aug. 11, 2000, entitled Rotocopter Passenger Vehicle With Vertical Lift Off and Landing, and of prior provisional patent application Serial No. 60/234,098, filed Sep. 21, 2000, entitled Passenger Vehicle Employing A Circumferentially Disposed Rotatable Thrust Assembly, the contents of which are herein incorporated by reference.

TECHNICAL FIELD

The present invention relates to passenger vehicles, and more particularly relates to a vertical take off and landing (VTOL) vehicle employing a circumferentially disposed, rotatable thrust assembly.

BACKGROUND OF THE INVENTION

Today, millions of people and vast amounts of goods are transported around the world in vehicles, ranging from cars, trucks, airplanes, helicopters, to marine vessels. Since there exist a number of different types of vehicles, the technologies surrounding the construction and propulsion of each vehicle are vast and disparate. In the VTOL area, there presently exist a number of different types of vehicles, including the conventional helicopter, such as the Apache or Cobra, the Osprey helicopter, and traditional dual rotor helicopters, such as the Chinook.

With regard to the conventional helicopter, the propeller generated thrust is relatively small and concentrated about the center of gravity of the helicopter. This arrangement is also unstable absent continuous operator control and corrections. The propeller blades of the helicopter must also not approach or exceed the speed of sound, since the airflow detaches from the blades, reducing power and decreasing the stability and operability of the vehicle, while concomitantly increasing noise.

Another disadvantage of the conventional helicopter is that the helicopter's speed maximum and other performance characteristics during horizontal travel (cruise) is the resultant asymmetrical lift and the resulting retreating blade stall.

Hence, there still exists a need in the art for an improved VTOL vehicle that has a safe and stable thrust force and does not require synchronizing multiple propulsion forces. In particular, a VTOL vehicle that generates a stable thrust force would represent a major improvement in the art.

The invention will next be described in connection with certain preferred embodiments. However, it should be clear that various changes and modifications can be made by those skilled in the art without departing from the spirit and scope of the invention. For example, various vehicles employing various arrangements and types of structural components that utilize the preferred practice of the invention can be employed to create a VTOL vehicle.

SUMMARY OF THE INVENTION

The present invention provides for a VTOL flying vehicle that is highly functional, scaleable, and extremely safe relative to existing design concept such as the helicopter. The VTOL vehicle of the invention bridges the function, safety, stability and capacity gap between the modern jet airplane and helicopter designs, while concomitantly being highly competitive with both the helicopter and modern conventional airplanes.

According to one aspect, the VTOL vehicle of the invention expands the operational roles of both helicopters and airplanes, can operate from a hover mode or from a propulsion mode where speeds of 360 knots and an altitude of 25,000 feet can be achieved. The VTOL vehicle has superior range (up to seven times more range) and payload (up to four times more payload) capabilities relative to the conventional helicopter. Moreover, the VTOL vehicle of the invention is highly flexible in design, such that it is generally "size agnostic" and therefore fully scalable. The vehicle can also be operated as an autonomous and/or unmanned transportation vehicle.

According to another aspect, the VTOL vehicle of the invention addresses a substantial market need for easy to land and operate passenger and cargo vehicles. The vehicle of the present invention can address the commercial aircraft market gap, while providing transportation for an ever increasing population. The vehicle addresses another problem by providing a vehicle that does not require large airport facilities.

The vertical take-off and landing vehicle of the invention can include a fuselage, a rotatable thrust assembly circumferentially disposed about the fuselage for generating a thrust force for moving the vehicle, and a rotation decoupling interface assembly concentrically disposed within the rotatable thrust assembly for mechanically coupling the rotatable thrust assembly to the fuselage without imparting rotational movement thereto. The vehicle further includes a two or more power sources coupled to either the rotatable thrust assembly or the rotation decoupling interface assembly for imparting rotational movement thereto.

According to one aspect, the rotatable thrust assembly includes a plurality of support elements spanning between an outer frame element and an inner frame element. Moreover, the rotatable thrust assembly is adapted to be circumferentially rotatable and pivotably movable about the fuselage, and is configured to rotate independently of the fuselage.

According to another aspect, the power sources generate a single composite thrust force from a plurality of individual thrust forces for powering the vehicle. The power sources also disposed about either an outer periphery or an inner periphery of the rotatable thrust assembly, and are radially movable relative to the rotatable thrust assembly. The VTOL vehicle also includes structure for adjusting the angle of the power sources or the angle of the thrust relative to the thrust assembly According to another aspect, the thrust assembly includes one or more airfoils, which are movable between a deployed position, where the airfoil extends outwardly from the thrust assembly, and a retracted position for stowing the airfoil within the thrust assembly. The thrust assembly can also include structure for adjusting the angle of the airfoil.

According to another aspect, the thrust assembly includes an outer frame member, an inner frame member disposed within the outer frame member, and a plurality of support elements spanning between the outer and inner frame members. Each of the outer and inner frame members and the support members include a fluid passage for centrifugally transferring fuel therethrough to the power sources. The rotatable thrust assembly is also disposable between a first position for placing the vehicle in a hover position, and a second position for propelling the vehicle in a selected direction.

According to another aspect, the rotation decoupling interface assembly includes a fuel source coupled to the fluid passage for transferring fuel from the fuel source to the power sources.

According to still another aspect, the rotation decoupling interface assembly is sized and configured for storing a fuel for the power sources, and for evenly and circumferentially distributing the fuel therein. The rotation decoupling interface assembly can include one or more roller bearing assemblies, and a fuel tank for storing fuel. The roller bearing assemblies can be coupled to the rotatable thrust assembly and to the fuselage.

According to still another aspect, the fuselage can include one or more direction control elements operable for controlling the direction of the vehicle. The fuselage and the rotation decoupling interface assembly include two or more tilt rods extending outwardly therefrom for supporting the fuselage within the rotation decoupling interface assembly. The fuselage is pivotably movable about the tilt rods when coupled to the rotation decoupling interface assembly.

According to another aspect, the vehicle includes structure for disconnecting the fuselage from the rotation decoupling interface assembly. The vehicle can also include a first fuel storage element for storing fuel for the power sources.

According to another aspect, the rotation decoupling interface assembly includes a second fuel storage element for storing fuel, and a fuel pump for transferring fuel between the first and second fuel storage elements.

The present invention also provides for a vertical take-off and landing vehicle having a rotatable thrust assembly for generating a single total thrust force having a selected force area for powering the vehicle. The thrust assembly includes a plurality of frame elements, a plurality of support elements disposed between the frame elements, and a plurality of power sources coupled to at least one of the plurality of frame elements. The vehicle further includes a fuselage coupled to the thrust assembly, and which is rotationally decoupled therefrom. Each of the plurality of power sources generates a thrust force that forms, in combination with the frame elements and the support elements, a single total thrust force.

According to one practice, the single total force has an annular thrust force area, which is disposed about the fuselage. The single total thrust force is separated from the center of the vehicle. Further, the single total thrust force comprises an inner portion separated from the center of gravity of the fuselage by a distance D, and an outer portion separated from the center of gravity of the fuselage by a distance L, such that the ratio L/D is about 10.

The present invention also provides for a vertical take-off and landing vehicle having a thrust assembly for generating a single total thrust force having a selected force area for powering the vehicle. The thrust assembly includes a plurality of concentrically disposed frame elements, a plurality of support elements disposed between the frame elements, and a plurality of power sources coupled to at least one of the frame elements. The vehicle further includes a fuselage coupled to the thrust assembly, such that the total thrust force completely surrounds a center of gravity of the vehicle.

The present invention also provides for a vertical take-off and landing vehicle having a thrust assembly for generating a single total thrust force having a selected force area for powering the vehicle. The thrust assembly includes a plurality of concentrically disposed frame elements, a plurality of support elements disposed between the ring elements, a plurality of power sources coupled to at least one of the plurality of ring elements, and a fuselage coupled to the thrust assembly. The vehicle has a center of gravity and the single total thrust force is distributed about a perimeter of the vehicle and substantially separated from the center of gravity.

The present invention also provides for a vertical take-off and landing vehicle having a thrust assembly for generating a single total thrust force having a selected force area for powering the vehicle. The thrust assembly includes a plurality of frame elements having an airfoil coupled to at least element, a plurality of support elements disposed between said frame elements, a plurality of power sources coupled to at least one of said plurality of ring elements, and a fuselage coupled to the thrust assembly.

The present invention further provides a vertical take-off and landing vehicle having a thrust assembly including a plurality of concentrically disposed ring elements, a plurality of support elements disposed between said ring elements, a plurality of power sources coupled to at least one of said plurality of ring elements, a fuselage coupled to the thrust assembly, wherein the thrust assembly is rotationally decoupled from the fuselage, and structure for adjusting the position of the support elements during use.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, may show relative dimensions.

FIGS. 4A–4D illustrate various positions of the thrust assembly when moved between the horizontal lift position and the generally vertical propulsion position according to the teachings of the present invention.

DETAILED DESCRIPTION OF THE INVENTION

The present invention provides for a VTOL flying vehicle that employs a pivotable rotating thrust assembly for powering the vehicle during use. Specifically, the rotatable thrust assembly of the present invention provides thrust for a vertical take off and landing, as well as providing sufficient thrust for propelling the vehicle during flight. The thrust assembly of the invention converts or translates the power of a plurality of discrete and separate power sources into a single total thrust force. The thrust assembly generates a thrust force having a selected area that is separated from, and preferably significantly separated from, the center of gravity of the vehicle.

The thrust assembly of the invention stores rotational energy during use since it functions similar to a 'flywheel.' Consequently, the thrust assembly functions as a buffer by smoothing out temporary perturbations in the vehicle, such as those created by the external environment, such as by wind, or by one or more vehicle components.

The thrust assembly of the invention is preferably movable between a horizontal lift position for generating thrust forces sufficient to lift the vehicle, and a vertical thrust position for generating a horizontal thrust force for moving the vehicle forward, as well as any intermediate position.

The vehicle of the invention further employs a rotational interface assembly for coupling a fuselage to the thrust assembly, while concomitantly rotationally decoupling the fuselage from the thrust assembly.

Figure 1:
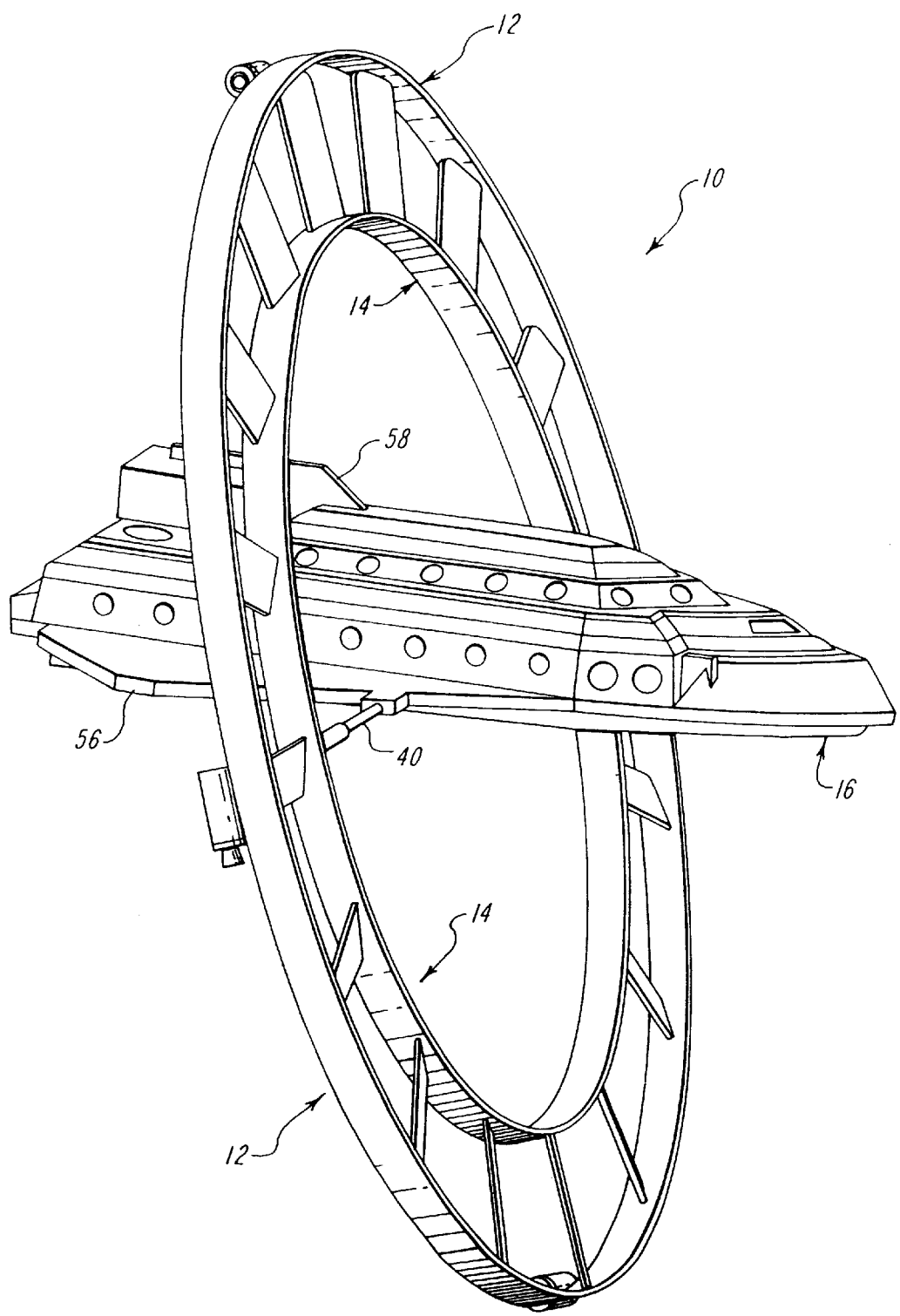
FIG. 1 is a perspective view of the VTOL vehicle of the present invention.

FIG. 1 illustrates a perspective front view of one embodiment of the VTOL vehicle 10 according to the teachings of the present invention. As used herein, the term VTOL vehicle is intended to include any suitable vehicle, such as a helicopter, that vertically takes off from a site and lands in a similar manner. The vehicle can be configured to hold passengers of any suitable number, and goods or freight of any size, weight, and quantity. The vehicle can also be adapted to fly unmanned.

The illustrated vehicle 10 comprises three main assemblies, including a rotating thrust assembly 12 with blade-like support elements, a concentrically disposed rotation decoupling interface assembly 14, and a fuselage 16, which is mounted within a center portion of the vehicle. The thrust assembly 12 provides the power or thrust for propelling the vehicle during use, as well as operating as a fuel storage component for storing fuel for associated power sources. The rotating thrust assembly 12 rotates about the fuselage 16 in order to generate an appropriate amount of thrust for either lifting the vehicle, propelling the vehicle forward, or maintaining a stationary or hover position.

The illustrated rotation decoupling interface assembly 14 is concentrically disposed within the thrust assembly 12 and serves to couple the fuselage 16 to the thrust assembly 12. The interface assembly rotationally decouples the thrust assembly 12 from the fuselage 16 in order to prevent the fuselage from rotating during flight. Further, the interface assembly operates as a fuel storage component for storing fuel for the power sources of the thrust assembly. The assembly is illustrated in simplified schematic form as an inner ring, with additional detail described further below.

The fuselage houses the passengers or freight, and functions as the control center for the vehicle. As used herein, the term fuselage is intended to include any suitable enclosed or partially enclosed cabin or container that is sufficient and suitable for carrying passengers and/or cargo, while housing or including electronics, secondary power sources, airfoils, and the like, as is normally associated with vehicles suitable for flight. The illustrated fuselage 16, which includes relatively short wings, is preferably configured to provide additional aerodynamic lift during passenger vehicle use in order to supplement the power generated by the thrust assembly 12. The fuselage can also employ secondary or supplemental power sources for providing additional power during use. According to one practice, the fuselage 16 can further enclose supplemental fuel tanks for providing fuel for the supplemental power source, as well as for the power sources of the thrust assembly 12. Those of ordinary skill will readily recognize that the fuselage can further include suitable and appropriate electrical and electronic controls for the vehicle. When appropriately configured, the fuselage can provide a significant amount of aerodynamic lift during flight of the vehicle 10.

Furthermore, depending upon the fuselage shape and use of the overall vehicle 10, other suitable airfoils, such as wings, rudders, flaps, and/or short wings such as aerons can be employed.

Figure 2:
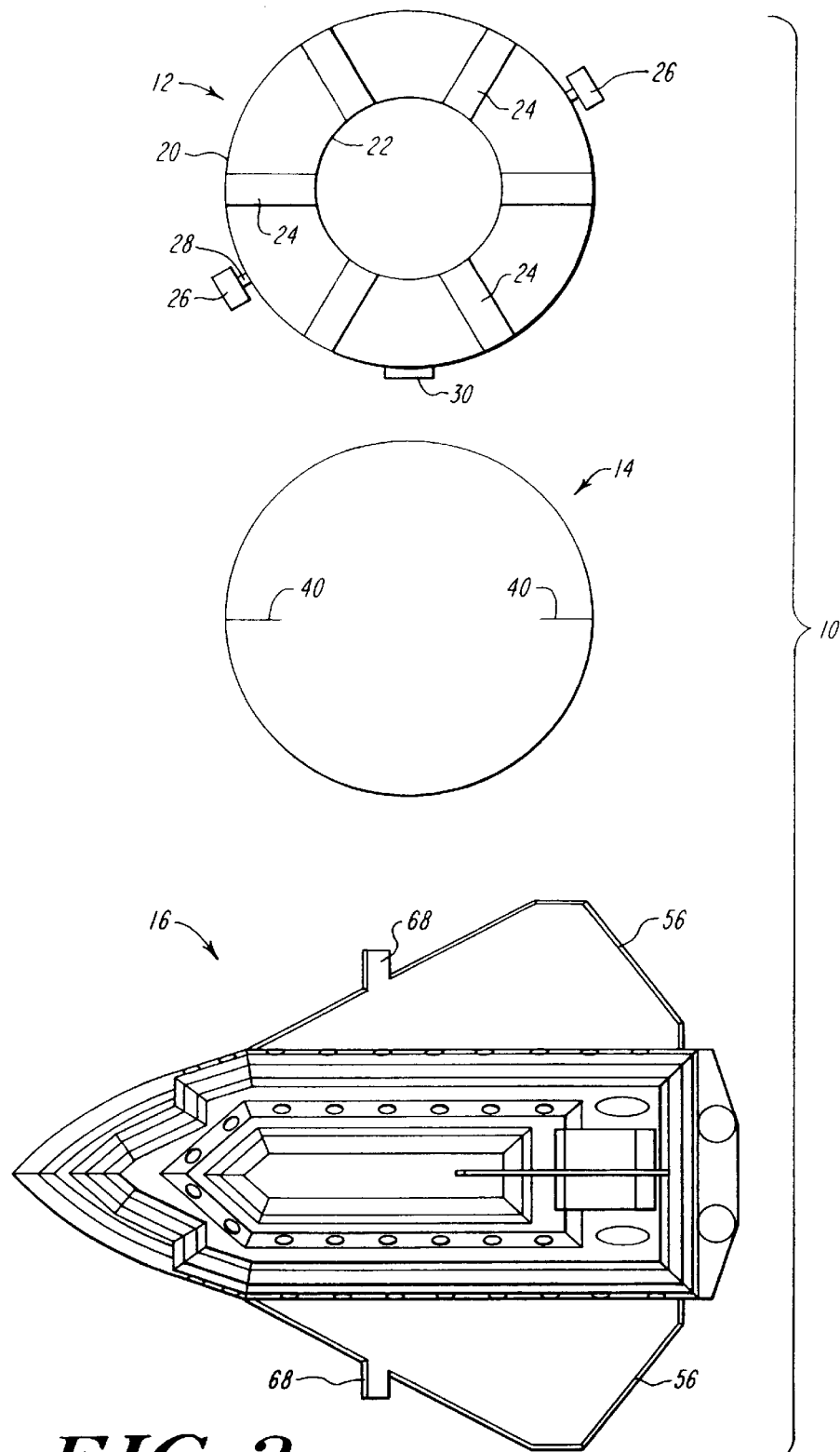
FIG. 2 is a disassembled view of the VTOL vehicle of FIG. 1 illustrating the various sub-assemblies according to the teachings of the present invention.

FIG. 2 is an unassembled top view of simplified versions of the main subassemblies of the VTOL vehicle 10 of FIG. 1. The illustrated rotatable thrust assembly 12 employs inner and outer frame elements 20 and 22, between which span support elements 24. A number of power sources 26 are coupled to the thrust assembly 12 by suitable mechanical attachments 28. The power sources 26 rotate the thrust assembly 12 about the fuselage, and the support elements in conjunction with the power sources 26 generate a thrust force. The thrust force can lift the vehicle from the ground, place the vehicle in a hover position, or propel the vehicle forward.

As used herein, the term "frame element" is intended to include any suitable mechanical structure suitable for mounting or supporting various vehicle components, while concomitantly providing mechanical strength and support for the components as well as the overall vehicle. Any suitable number of frame elements can be used, and preferably a pair of concentrically disposed circular frame elements are employed. The frame elements can have any suitable shape, such as circular, hexagonal, and any other shape suitable for functioning as a support frame for rotating a portion of the vehicle. The frame elements can be composed of any suitable material, including metal, metal alloys, composite material, aluminum, as well as other material suitable for providing sufficient mechanical support while withstanding the rotational forces generated by the thrust assembly 12.

The term "support element" is intended to include any suitable element that is adapted, sized, configured or dimensioned for providing mechanical support for one or more vehicle components, and/or providing aerodynamic lift to the vehicle 10. The support element can have any selected shape and size. Examples of suitable support elements include rods, blades, and other types of air foils, including aerons and ailerons, as well as other structure having sufficiently configured aerodynamic surfaces. Those of ordinary skill will readily recognize that any suitable number of support elements can be employed in the thrust assembly 12 depending upon the diameter of the frame elements and the size of the support elements and the desired lift capabilities. The support elements can be fixed or non-movable when mounted to the frame elements, or can be mounted so as to be adjustable depending upon system needs. The support elements can be evenly spaced between the frame elements, or can be arranged to have any selected spacing according to design needs.

The term "power source" as used herein is intended to include any suitable power generating structure that is capable of exerting a force on the thrust assembly 12 for powering the vehicle 10. Examples of suitable power sources include jet engines, such as turbojets and turbofans, as well as propeller based systems, such as turbopropeller systems. The power sources mounted to the frame element function as the primary power source for rotating the thrust assembly. Those of ordinary skill will readily recognize that any suitable number of power sources can be employed to apply a force to the thrust assembly 12, provided that at least two power sources are used to generate a generally balanced force on the thrust assembly. Additional power sources can also be mounted to the frame element depending upon system need. Those of ordinary skill will readily recognize that increasing the number of power sources can significantly reduce the G-forces each power source is subjected to during flight, without sacrificing the aggregate thrust or lift power. Moreover, the power sources 26 can be coupled to any portion of the thrust assembly, such as to the inner or outer frame element, or to the rotation decoupling interface assembly. The power sources can be externally mounted to the frame elements via suitable connections, or can be housed within the frame elements.

The illustrated thrust assembly 12 can further employ one or more airfoils 30 for adjusting, regulating, or altering the aerodynamic properties of the overall thrust assembly 12. As illustrated in FIGS. 2, 3A, 3B, and 3C, the airfoil 30 can be fixed in an outwardly projecting manner relative to one of the frame elements, or can be movable between a retracted position, where the airfoil is housed within the frame element 20, and a deployed position where the airfoil extends radially outwardly from the frame element. As used herein, the term "airfoil" is intended to include any structure suitable for adjusting, regulating, altering or controlling the aerodynamic properties of another component of the VTOL vehicle 10. The air foil is configured or designed to aid or assist in lifting, propelling or controlling the vehicle 10 by making use of air currents which flow thereover. Suitable examples of airfoils include any aerodynamically configured mechanical element having exterior surfaces sufficient to provide a certain selected air profile, such as a wing, aeron, aileron, blade, fin, and other like structure. The airfoil can have any selected shape and can comprise any number of segments or portions. The airfoil can also be located any component of the vehicle 10, such as on the thrust assembly 12, the rotation decoupling interface assembly 14, and/or the fuselage 16. The selected frame element 20 is illustrated for sake of simplicity as a simple circular structure having an inner radius and an outer radius, although those of ordinary will readily recognize that the frame elements can have any selected shape, width and height.

Figure 3A:
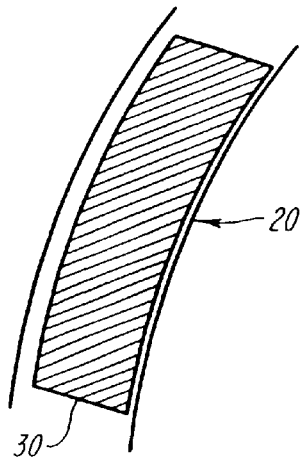
FIG. 3A is a schematic representation of the airfoil of the thrust assembly of the invention disposed in a retracted position.

The illustrated airfoil 30 can be disposed within the retracted position within outer frame element 20, FIG. 3A, for any selected period of time or portion of a rotation of the thrust assembly 12, such as during only a portion of a complete revolution of the assembly. According to an alternate practice, the airfoil 30 can be maintained or fixed within the deployed position, FIG. 3B, for any number of consecutive or nonconsecutive revolutions. Those of ordinary skill in the art will readily recognize that the airfoil can be disposed in the deployed position in order to maneuver the pivotable and tiltable thrust assembly 12 between various positions during various portions of the flight cycle of the vehicle 10. For example, the airfoil 30 can be disposed in the deployed position in order to move the thrust assembly 12 from a planar or horizontal lift position into a transverse or orthogonal propulsion position for moving the vehicle, such as in a direction having a horizontal movement component.

Figure 3B:
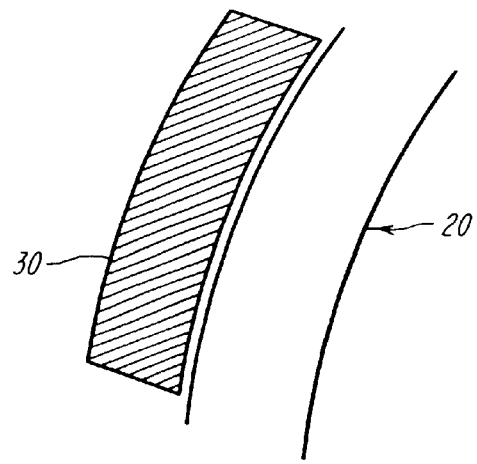
FIG. 3B is a schematic representation of the airfoil of the thrust assembly of the invention disposed in a deployed position.
Figure 3C:
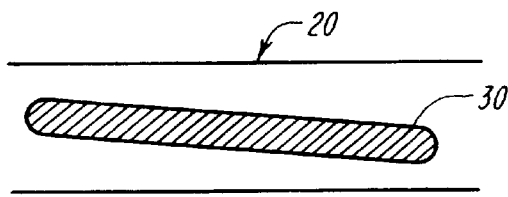
FIG. 3C is a schematic representation of the airfoil of the thrust assembly when stowed within the frame element.

As illustrated in FIG. 3C, the airfoil 30 when placed in the retracted position within the frame element 30 can be tilted at any selected angle. The angular disposition of the airfoil 30 allows the airfoil to adjust or regulate the position of the thrust assembly 12 during use. Those of ordinary skill will readily recognize that the airfoil 30 can be stowed within the frame element at any selected angle. The frame element can include structure for varying the angle of the airfoil according to system needs. According to an alternate embodiment, the airfoil can be formed of multiple telescoping sections that are movable between selected positions top adjust or regulate the aerodynamic properties of the vehicle during flight.

FIGS. 4A through 4D illustrate the movement of the thrust assembly 12 between the lift (horizontal) position and the propulsion (vertical) position during use. The illustrated vehicle includes, according to an alternate embodiment, four power sources 26 evenly spaced about the frame element 20. For example, when the illustrated VTOL vehicle 10 is taking off, landing, or situated in a hover mode, the fuselage 16 and the thrust assembly 12 are generally coplanar, and hence the thrust assembly 12 is disposed in a relatively horizontal lift position, FIG. 4A. According to one practice, to assist in take-off, the fuselage can employ an on-board power source to lift one end a selected amount to enhance or promote take-off. The thrust generated by the thrust assembly 12 is indicated by the arrows.

The thrust assembly 12 is tiltable or pivotable about an axis of the fuselage 16 into a transverse or orthogonal propulsion position depending upon the particular mode of operation. According to one practice, when it is desired to move the passenger vehicle 10, the thrust assembly 12 can be moved from the lift position 12 to a non-coplanar permanent, intermediate, or transitory propulsion position, as illustrated in FIG. 4B. In this position, the thrust assembly 12 is transverse to the longitudinal axis of the fuselage 16. In this embodiment, the thrust assembly 12 begins to develop a horizontal thrust force vector which moves the passenger vehicle in a forward direction.

Figure 4C:
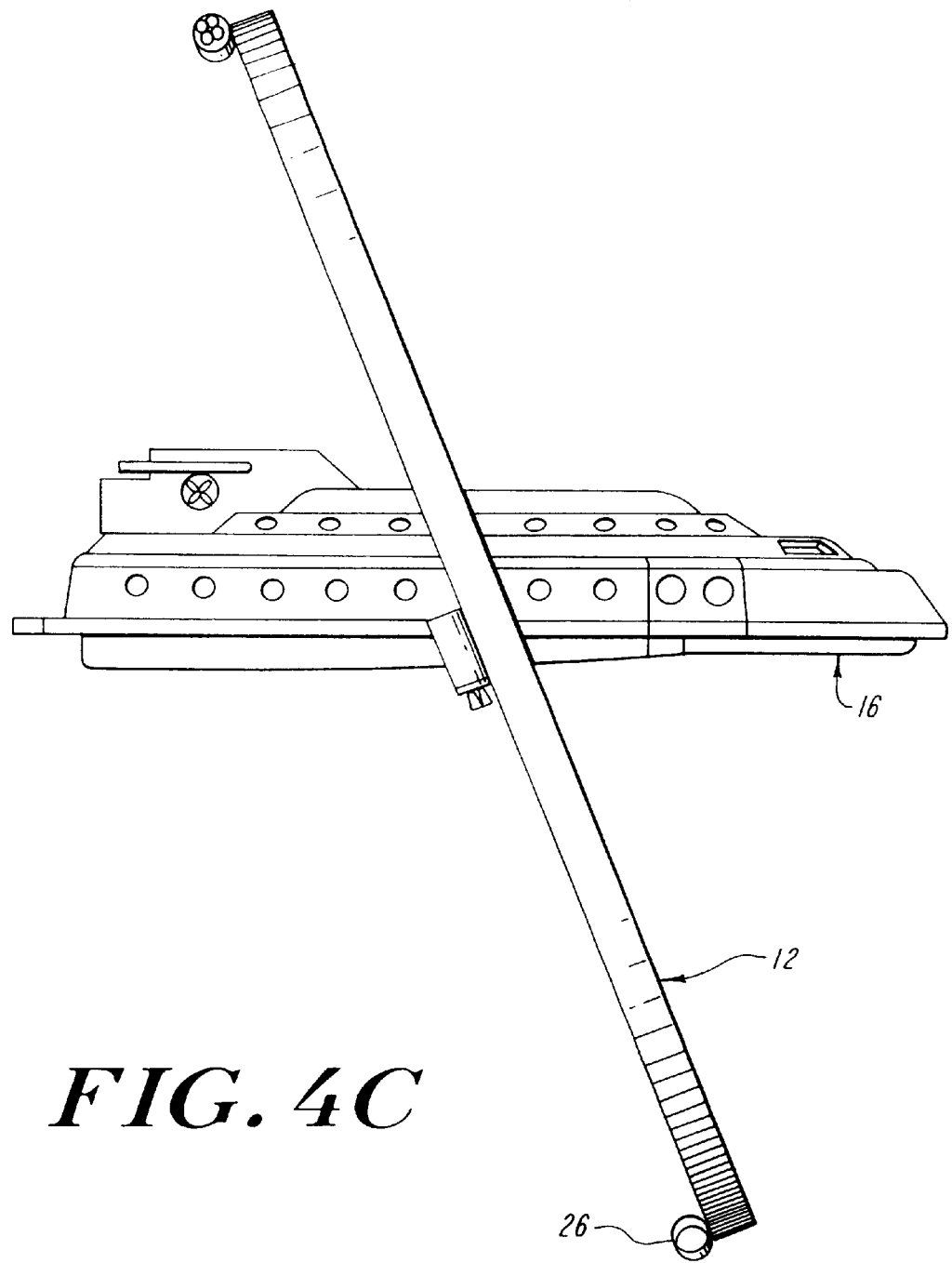

As discussed above, the thrust assembly 12 can be moved from the substantially horizontal lift position, as illustrated in FIG. 4A, into the transverse position of FIG. 4B by the airfoil 30, FIGS. 3A–3C. If it is desired to generate additional horizontal thrust, the illustrated thrust assembly 12 can be moved into any other suitable transverse position, as illustrated in FIG. 4C.

Figure 4D:
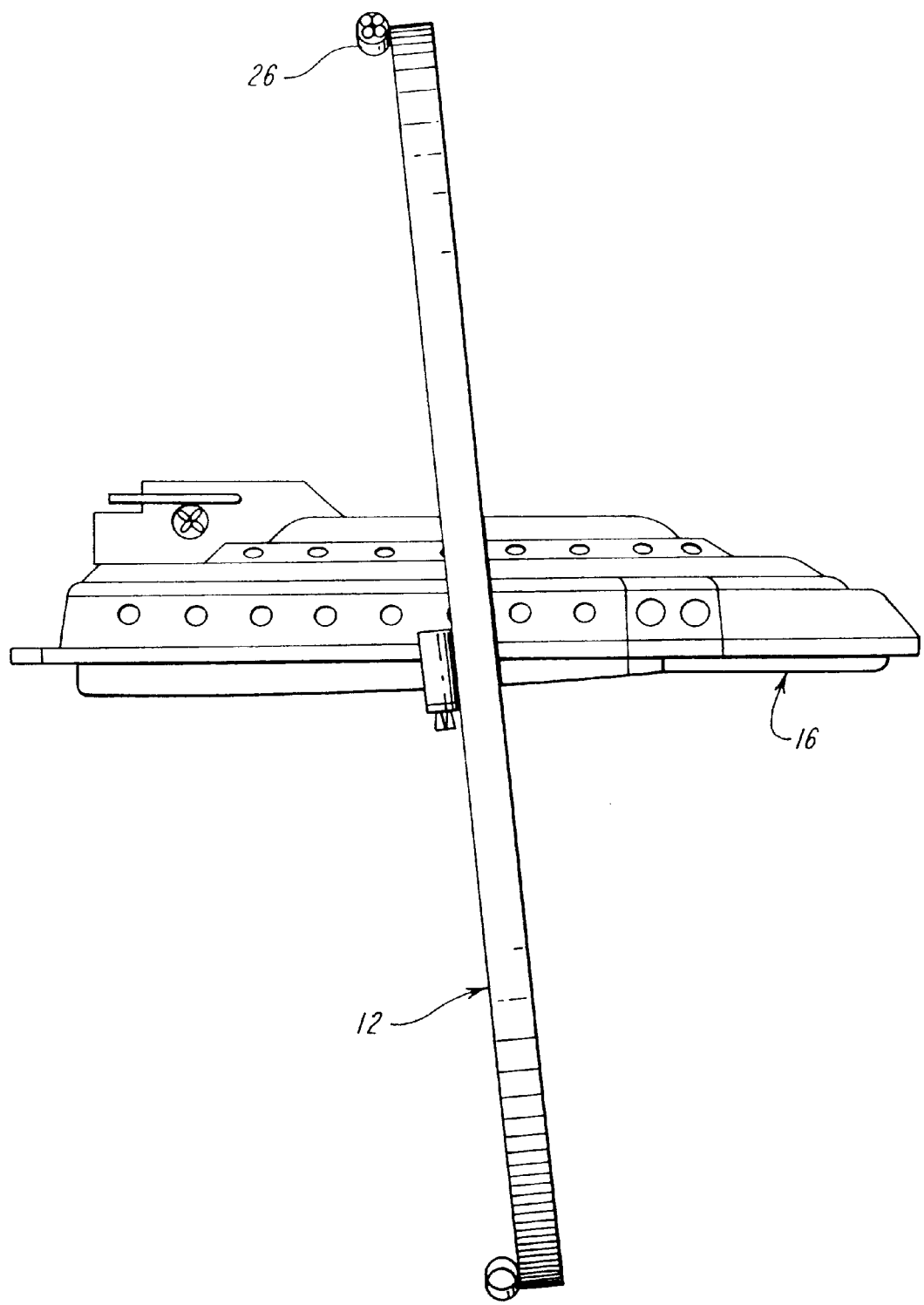

If it is desired to generate a greater additional horizontal thrust component, the illustrated thrust assembly 12 can be moved into any other suitable transverse position, and if desired, can be moved into a substantially orthogonal position as illustrated in FIG. 4D. In this position, the thrust force generated by the thrust assembly 12 is substantially horizontal, and hence serves to propel or drive the vehicle forward. Specifically, more horizontal thrust force is generated as the thrust assembly is vertically tilted.

When it is desired to reduce the amount of horizontal thrust generated by the thrust assembly 12, the assembly can be moved from the substantially orthogonal position of FIG. 4C into any selected transverse position, such as the transverse positions illustrated in FIGS. 4A, 4B and 4C, in order to reduce the magnitude of the horizontal thrust force vector. The illustrated thrust assembly 12 is generally moved from the substantially orthogonal position to the transverse position when it is desired to reduce the vehicle speed, such as when initiating a landing procedure or disposing the vehicle in a hover mode.

A significant advantage of the thrust assembly 12 of the present invention is that it is typically comprised of a pair of relatively large concentric frame elements that are interconnected by a plurality of support elements. This provides for a relatively large propeller-like structure that is rotated from an inner or outer diameter surface, rather than from a central position, such as which typically occurs with a helicopter. By applying a force away from the center of the frame elements, the thrust assembly 12 is capable of employing any selected number of support elements in order to efficiently and easily, and with sufficient power, generate thrust for moving the passenger vehicle 10.

Another significant advantage of the illustrated thrust assembly 12 is that it, in operation, mimics, to some degree, a fly wheel, and therefore stores a significant amount of rotational energy during use. The stored rotational energy enables the illustrated VTOL vehicle 10 to easily maneuver between multiple different positions while concomitantly providing for a relatively stable flight. Specifically, the stored rotational energy tends to isolate or buffer the fuselage 16 from any sudden asymmetric force, such as those generated from the vehicle, wind, power sources, pilot error and the like.

A further significant advantage of the illustrated thrust assembly 12 of the present invention is that it provides for a relatively large, perimeter driven rotating assembly for propelling the vehicle 10. In the illustrated design, the individual thrusts of the plurality of power sources 26 coupled to the thrust assembly 12 are converted into a single total thrust force which is used to power the vehicle. Since the predominant or significant thrust generated by the passenger vehicle 10, and more specifically by the thrust assembly 12, is from the rotation of the frame and support elements, the vehicle avoids the need to synchronize multiple large predominant thrust forces which are typically generated in conventional vehicles.

Figure 5:
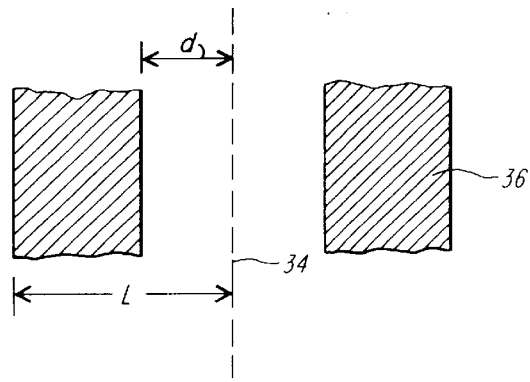
FIG. 5 is a schematic representation of the thrust force area generated by the thrust assembly of the present invention.

FIG. 5 illustrates the single total thrust force generated by the thrust assembly 12 of the VTOL vehicle 10 of the present invention. The thrust force area is illustrated, for the sake of simplicity, by an annular ring which corresponds to a column of air which is moved by the thrust assembly 12 of the invention. This is illustrated in cross-sectional form in FIG. 5. The total thrust force contained within the annulus 36 is disposed away from the center 34 of the overall vehicle 10. Those of ordinary skill will readily recognize that the center 34 may also correspond to the center of gravity of the vehicle during use. The single total thrust area represented by the annulus 36 has an inner portion which is separated from the center 34 by a distance D, and the outer portion of the total thrust force area is separated from the center 34 by the distance L. The distance D is relatively large since the overall thrust force area is significantly removed from the center of rotation. According to one practice, the ratio of L/D is about 10. This arrangement produces an overall stable flight pattern for the vehicle.

The use of the illustrated thrust assembly 12 eliminates the constraints of typical propeller based thrust force systems employed in conventional passenger vehicles, such as helicopters. Specifically, the use of the peripherally mounted power sources 26 removes or avoids a key limitation of conventional systems, namely, the speed limitation of propeller blades. The conventional limitation for propeller based system is due to the fact that the tips of the propeller must not approach, let alone exceed, the speed of sound, which is approximately 760 miles per hour. In the VTOL vehicle 10 of the present invention, the support elements typically operate at a third of this speed, and hence are not confined by the conventional speed limitations of center driven propeller systems.

A further significant advantage of the present invention is that the support elements of the thrust assembly 12 can travel much slower than the propeller blades of the conventional helicopter based systems. This occurs since the thrust assembly blades are placed much farther from the rotational center of the vehicle or assembly, thus "traveling" in much larger area than conventional helicopter rotor blades. This allows for an efficient use of a larger number of blades with significantly larger aggregate blade square area. The RPMs of the thrust assembly, and hence the support elements, can therefore be lowered while keeping the aggregate thrust/lift the same or even higher than the conventional helicopter rotors. This significantly reduces the vibrations, stress and strain on the overall mechanical components of the vehicle 10 while concomitantly providing significant thrust for powering the vehicle.

With reference again to FIGS. 1–3C, the illustrated power sources 26 can be fixed in a selected position, or can be movable to provide different selected thrust force angles. By varying the thrust force angle of the power source 26, the vehicle 10 can provide different horizontal and vertical force vectors. Moreover, the thrust assembly 12 can employ more powerful power sources relative to fixed position power sources. Specifically, the thrust force angle of the variably movable or adjustable power sources can generate a thrust force that can be dissipated in a selected direction. For example, if the thrust force angle is 45 degrees, the vertical and horizontal thrust vectors are equal to about one-half of the total thrust output of the power source. Therefore, only one-half of the total thrust (the horizontal thrust force vector) is used to rotate the thrust assembly 12. The other or remaining portion of the total thrust force is used to generate an additional direct vertical lift. Those of ordinary skill will recognize that the same type of movement can be achieved in fixed location power sources by varying the position or direction of the nozzles of the power sources. Hence, structure can be provided for varying the nozzles of the power sources rather than varying the overall angle of the entire power source.

According to another practice, the radial position of the power source 26 can be varied by moving the power source radially inwardly and/or outwardly according to system needs. The attachment mechanism 28 can hence be employed to move the power sources between the selected radial positions.

The illustrated inner frame element 22 can be configured to function as a fuel storage tank by storing fuel therein. The fuel stored or transferred to the inner frame member 22 can be centrifugally transferred to the outer frame element 22 by the rotational movement of the thrust assembly 12. Hence, the thrust assembly 12 does not require the use of ancillary fuel pumps to transfer the fuel between the inner and outer frame elements. Those of ordinary skill will readily recognize that any appropriate fuel transferring conduits can be employed to transfer the fuel from the inner frame element to the outer frame element, and thus to the power sources. According to one practice, the fuel can be transferred between the frame elements 20 and 22 through one or more of the support elements 24.

Figure 6:
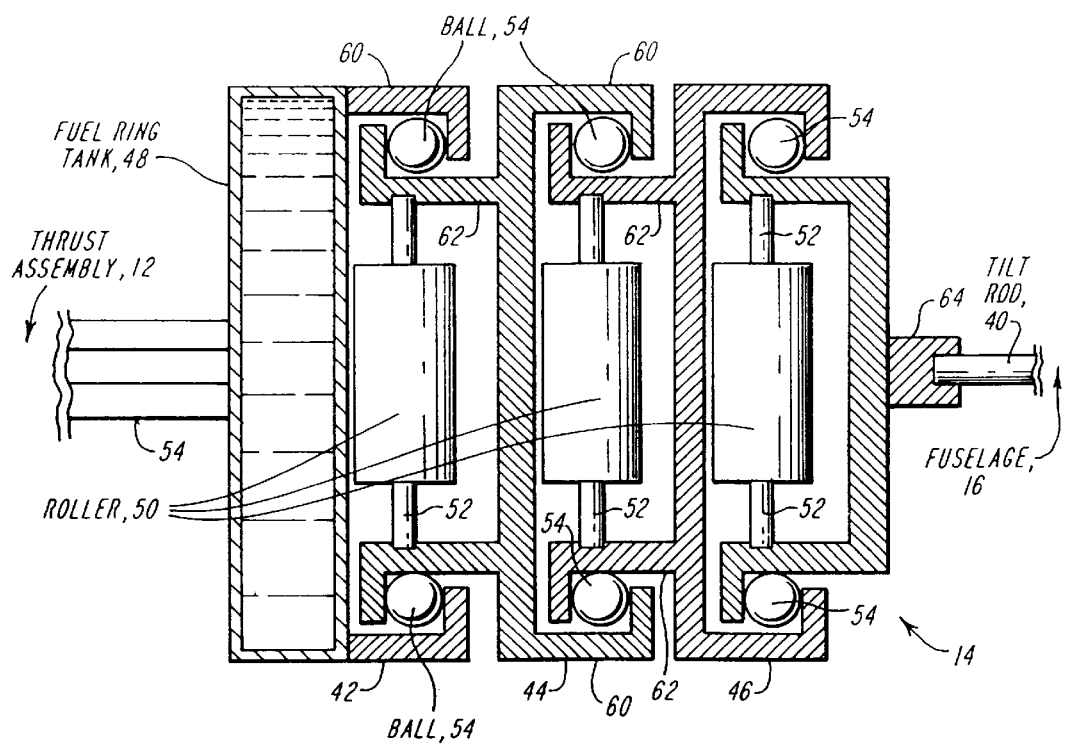
FIG. 6 is a detailed schematic diagram of the rotary interface assembly of the vehicle of FIG. 1 according to the teachings of the present invention.

With reference to FIGS. 1, 2 and 6, the assemblage of the fuselage 16 to the rotary thrust assembly 12 is effected by the rotation decoupling interface assembly 14. The fuselage 16 is coupled to the rotation decoupling interface assembly 14 by a pair of tilt rods 40. The illustrated interface assembly 14 is mechanically and at least partially rotationally coupled to the rotary thrust assembly 12. The interface assembly 14 can comprise any selected arrangement of components that are adapted for rotationally coupling at least partially to the rotatable thrust assembly 12, while concomitantly rotationally decoupling the thrust assembly 12 from the fuselage 16. This arrangement is preferred since it is undesirable to transfer significant rotational energy generated by the thrust assembly 12 to the fuselage 16.

FIG. 6 is a schematic detailed depiction of the rotation decoupling interface assembly 14. The interface assembly 14 can comprise a set or series of horizontally or vertically nested roller bearing assemblies, such as the illustrated roller bearing assemblies 42, 44 and 46. The illustrated rotation decoupling interface assembly 14 can further include a fuel tank 48 for storing fuel which is used by the fuselage and/or the power sources 26 of the thrust assembly 12. Those of ordinary skill will readily recognize that the fuel tank 48 can comprise part of the rotation decoupling interface assembly 14, or can comprise part of the thrust assembly 12. For purposes of clarity, we describe the fuel tank herein as being part of the rotation decoupling interface assembly 14, although those of ordinary skill will readily recognize that the fuel tank can also form part of one or more other vehicle assemblies. According to one embodiment, the fuel tank can be formed as a major ring that houses the roller bearing assemblies, or can be formed as a separate fuel tank that is coupled to the roller bearing assemblies.

The illustrated roller bearing assembly 42 is rotationally coupled to the thrust assembly 12. The illustrated roller bearing assembly 42 employs a roller 50 that is mounted about a support rod 52 within an internal portion of the assembly 42. A plurality of bearings 54 are mounted at suitable locations between inner and outer housing portions 60 and 62 in order to allow the roller bearing assembly 42 to move relative to the thrust assembly 12. The illustrated roller 50 also assists in allowing the roller bearing assembly 42 to rotate relative to other components, such as the thrust assembly, while simultaneously providing minor frictional forces that allow the separate assemblies to engage each other. Those of ordinary skill will readily recognize that the roller 50 is intended to provide a surface over which another vehicle component slides, while providing, if desired, frictional forces to promote engagement of the components. The illustrated roller 50 as well as the bearings 54 can take any suitable shape consistent with the teachings herein.

The roller bearing assembly 42 is further adapted to be synchronized with the thrust assembly 12, as well as the adjacent or contiguous roller bearing assembly 44. Likewise, the roller bearing assembly 44 is intended to be contiguous with the roller bearing assembly 46 and is adapted to work in conjunction therewith to rotationally decouple the fuselage 16 from the thrust assembly 12 and the roller bearing assembly 42. The illustrated roller bearing assemblies 44 and 46 comprise components similar or identical with the bearing assembly 42. For example, the roller bearing assemblies 44 and 46 can include a roller 50 and bearings 54 disposed between housing portions 60 and 62. Although illustrated along an outside portion of the rotation decoupling interface assembly 14, the illustrated fuel tank 48 can be disposed at other locations, such as along an inner surface of the rotation decoupling interface assembly 12 adjacent the fuselage 16. The illustrated fuel tank 48 is further coupled to a fuel transfer conduit 54 that is sized and dimensioned for allowing fuel from the fuel tank 48 to be transferred by centrifugal forces to the thrust assembly 12. The inner roller bearing assembly 46 can include a connection portion 64 that is adapted to mount the tilt rod 40.

Those of ordinary skill will readily recognize that any selected number of roller bearing assemblies can be employed in order to achieve the functionality described herein. For example, a pair of roller bearing assemblies can be employed instead of the illustrated roller bearing assemblies 42–46, or additional roller bearing assemblies can be provided based on system designs. As used herein, the term "rotation decoupling interface assembly" is intended to include any assemblage of components that provides mechanical support for coupling the fuselage 16 with the thrust assembly 12. According to a preferred practice, the rotary interface assembly rotationally decouples the fuselage 16 from the thrust assembly 12, while providing components that, at least in part, rotate in conjunction with the thrust assembly 12.

When the fuel tank 48 is disposed along an inner portion of the rotation decoupling interface assembly 14 adjacent the fuselage 16, or is in the fuselage itself, suitable fuel pumps can be employed in order to transfer the fuel from a relatively stationary inner portion of the rotary interface assembly (such as roller bearing assembly 46) to the rotating outer portion of the rotation decoupling interface assembly 14 (such as roller bearing assembly 42). Once the fuel is transferred by the fuel pump to the outer portion of the interface assembly 14, centrifugal forces can then deliver the fuel to the thrust assembly, and then to the power sources 26.

According to one preferred embodiment, the roller bearing assembly 42 rotates with the thrust assembly 12 in order to provide coupling between the rotation decoupling interface assembly 14 and the thrust assembly 12. The intermediate roller bearing assembly 44 is synchronized with the roller bearing assembly 42 in order to further rotationally decouple the rotational inertia of the thrust assembly 12 from the fuselage 16. The inner stationary roller bearing assembly 46 is also synchronized and coupled with the intermediate roller bearing assembly 44 in order to ensure substantially complete rotational decoupling between the fuselage 16 and the thrust assembly 12.

The illustrated rotation decoupling interface assembly 14 can be configured to have a selected advantageous aerodynamic profile in order to minimize the amount of air drag during use of the vehicle. In particular, from an aerodynamic perspective, the rotation decoupling interface assembly 14 can be flattened according to known aerodynamic techniques, such as ducting. The leading edge or angle of incidence of the circular ducted rings can be provided with an aerodynamic edge or shield. In like fashion, the components of the thrust assembly 12 can also be formed or modified in a similar manner. With regard to the illustrated rotation decoupling interface assembly 14, and in particular to the roller bearing assemblies 42-46, the assemblies can be configured to minimize the air profile and corresponding air drag. Hence, the rotation decoupling interface assembly 14 can be designed and configured to provide mechanical coupling, while simultaneously functioning as an airfoil.

With reference to FIGS. 1 and 2, the fuselage 16 is mechanically mounted to the tilt rods 40 of the rotation decoupling interface assembly 14. The illustrated fuselage 16 can employ, if desired, one or more airfoils, such as the wings 56 and the aileron 58. The tilt rods 40 are coupled to a corresponding connector 68 formed in the outermost portions of the wings 56.

The illustrated fuselage 16 can further employ appropriate landing gear in order to provide suitable supports for landing the vehicle. Those of ordinary skill will readily recognize that the landing gear can be formed on other portions of the vehicle 10, such as the interface assembly 14 or the rotatable thrust assembly 12.

The illustrated fuselage 16 can also be configured to detach from the rotation decoupling interface assembly during extreme or catastrophic events. For example, the fuselage 16 can detach along the tilt rods 40 from the rotation decoupling interface assembly 14 if the power sources powering the thrust assembly 12 fail. The fuselage 16 can swivel about the rods 40 during flight to present, if desired, an optimal aerodynamic profile. This arrangement enables the fuselage to adjust its position relative to the thrust assembly. In other embodiments, the fuselage can be configured to float on water.

In operation, the thrust assembly 12 is disposed in a generally coplanar relationship with the rotation decoupling interface assembly 14 and the fuselage 16. The weight of the vehicle 10 can rest on the primary landing gears, which can be coupled to the fuselage 16, or to the rotation decoupling interface assembly 14. The power sources 26 coupled to the thrust assembly 12 are actuated according to a selected sequence. For example, the power sources 26 can be started at essentially the same time, or can be initiated separately or in pairs depending on the total number of power sources employed by the thrust assembly 12. According to a desired sequence, the thrust assembly 12 is initiated to revolve or rotate at relatively low speed (e.g., a low number of rotations per minute (rpm)) in order to assess or diagnose the vehicle performance. The pilot or user of the VTOL vehicle 10 can then increase the power output of the power sources 26 in order to increase the rpms of the thrust assembly 12. At some point the single total thrust force generated by the thrust assembly 12 generates a vertically oriented downward force that lifts the vehicle from the initial stationary position. The thrust assembly 12 can be employed to generate the appropriate amount of lift or thrust force in order to vertically move the vehicle 10.

When it is desired to propel the vehicle in a horizontal or forward manner, the thrust assembly 12 can be moved from the relatively horizontal or coplanar lift position to the transverse or orthogonal propulsion position. According to one practice, the deployable airfoil 30 can be deployed for certain selected periods of time or portions of the rpms. The airfoil 30 serves to initiate movement of the thrust assembly 12 from the horizontal lift position to the vertical propulsion position. Moreover, the VTOL vehicle 10 can further adjust the angular position of the support elements 24 and/or the power sources 26 in order to initiate the horizontal thrust force vector, and hence movement of the thrust assembly from the lift position to the propulsion position. Once the vehicle 10 is moving in a relatively horizontal manner, the aerodynamic configuration of the fuselage 16 can further add to the aerodynamic lifting force generated by the vehicle 10.

The thrust assembly 12 is moved from any selected transverse position towards an orthogonal position depending upon the need for the vertical thrust force vector. When the vehicle 10 has attained a selected altitude, the thrust assembly 12 can be moved into the fully orthogonal or perpendicular position relative to the fuselage 16 in order to solely generate a horizontal thrust force vector. The thrust assembly is disposed in the transverse position when going at relatively slow speeds since the aerodynamic lifting force generated by the fuselage is correspondingly lower. Conversely, the faster the vehicle travels, the fuselage generates a greater lifting force, and hence the thrust assembly does not need to generate as large a vertical lifting force, allowing the thrust assembly to be oriented closer an orthogonal position relative to the longitudinal axis of the fuselage.

A significant advantage of the VTOL vehicle of the present invention is that it can exceed the speeds of conventional helicopters, while concomitantly increasing the stability of the vehicle. Because of the significantly increased stability, the vehicle can be flown unmanned, if desired. The increase in speed of the vehicle 10 when compared to the helicopter is due to the fact that this vehicle is not affected during horizontal flight by the "retreating blade stall" syndrome which theoretically and practically limits the speed of all conventional helicopters.

Another advantage of the VTOL vehicle of the present invention is that the power sources of the thrust assembly 12 are mounted about the outer periphery of the assembly, thereby enabling a greater number of support elements to be employed.

Still another advantage of the vehicle is that the thrust assembly converts the power generated by the individual power sources into a single, highly stable thrust force. The thrust assembly hence operates as a highly stable 'flywheel,' which stores a significant amount of the rotational energy produced by the vehicle, resulting in significant rotational inertia. This inertia operates to buffer or isolate the fuselage from many sudden, unwanted forces, such as wind, engine power output vagaries or differences, pilot error, and the like. The flywheel effect is increased by the presence of the power sources about the outer periphery or circumference of the thrust assembly 12. The single thrust generated by the thrust assembly is continuous and distributed far from the center of the fuselage for additional stability. This thrust is also significantly wider than that of a conventional helicopter. For example, the thrust of the helicopter generates a narrow force area or column of air located at the center of gravity of the vehicle. This is inherently unstable. In contrast, the thrust force area generated by the VTOL vehicle of the present invention is significantly wider and separated or located away from the center of gravity of the vehicle to produce a stable thrust force.

Another advantage is that the vehicle of the present invention can employ jet engine technology to produce a scaleable (to any size) thrust/lift optimized to any size VTOL vehicle. The multiple jet engine technology can produce power greater than conventional helicopter designs. Moreover, a failure of one or more of the power sources does not translate to total inoperability of the vehicle. Rather, the vehicle is configured to operate in extreme or emergency conditions with as few as a single power source generating power. According to a preferred embodiment, however, the vehicle employs at least two power sources.

The thrust assembly of the invention can rotate the support elements at speeds far slower that the propellers of conventional helicopters, yet maintain the same degree of vertical thrust, thereby providing the vehicle of the present invention with a wide dynamic range of operating speeds.

Figure 7:
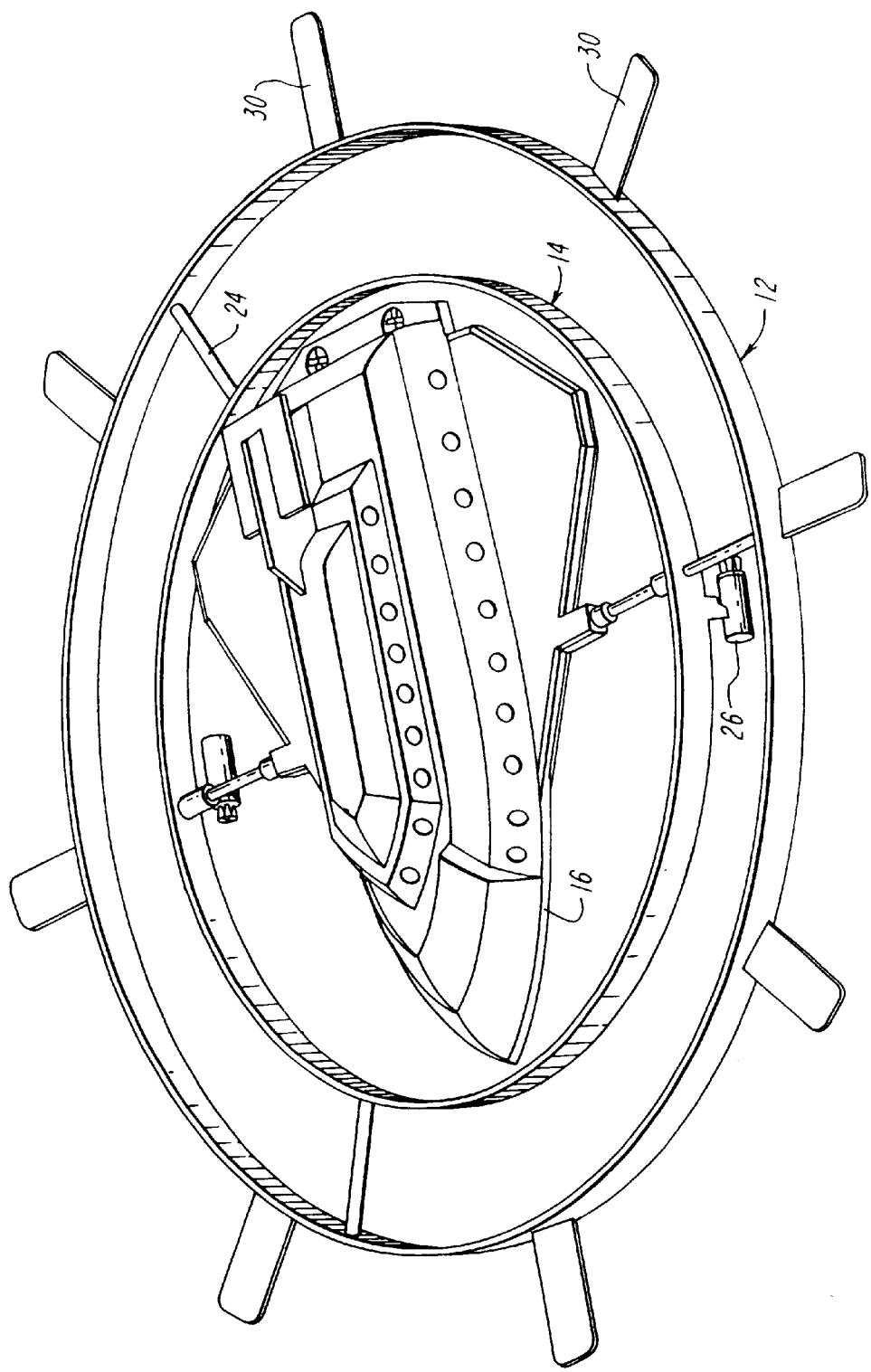
FIG. 7 is a perspective view of an alternate embodiment of the VTOL vehicle according to the teachings of the present invention.

According to an alternate embodiment, as illustrated in FIG. 7, the power sources 26 can be coupled to the rotation decoupling interface assembly 14 in order to provide sufficient thrust for powering the vehicle 10. The power sources 26 can be mounted to the fuel tank ring 48, FIG. 6, or to one or more of the roller bearing assemblies. According to a preferred design, the power sources 26 are mounted along an outer peripheral portion of the rotation decoupling interface assembly 14. The power sources operate in a manner similar to the power sources described above, and hence serve to rotate the interface assembly 14 and the thrust assembly 12. The illustrated assembly 12 can further include support elements mounted to the thrust assembly and extending radially outwardly therefrom. The airfoils can be canted or angled relative to the thrust assembly to regulate or adjust the aerodynamic properties of the thrust assembly 12. Although only two power sources are illustrated, those of ordinary skill will readily recognize that any suitable number can be used. Those of ordinary skill will also recognize that any type, shape or arrangement of components of the thrust and rotation decoupling interface assemblies can be used.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by letters patent is:

1. A vertical take-off and landing vehicle, comprising
   a fuselage,
   a rotatable thrust assembly circumferentially disposed about the fuselage for generating a force for moving the vehicle,
   a rotation decoupling interface assembly concentrically disposed within the rotatable thrust assembly for mechanically coupling the rotatable thrust assembly to the fuselage without impairing rotational movement thereto, said rotation decoupling interface assembly including nested roller bearing assemblies, and
   a plurality of power sources coupled to one of said rotatable thrust assembly and said rotation decoupling interface assembly for impairing rotational movement thereof.

2. The vehicle of claim 1, wherein the rotatable thrust assembly comprises a plurality of support elements spanning between an outer fame element and an inner frame element.

3. The vehicle of claim 1, wherein the rotatable rust assembly is adapted to be circumferentially rotatable about the fuselage.

4. The vehicle of claim 1, wherein the rotatable thrust assembly is adapted to be pivotably movable about the fuselage.

5. The vehicle of claim 1, wherein each of said plurality of power sources generates a force to form a plurality of forces, and wherein said rotatable thrust assembly is configured for translating said plurality of forces into a single primary composite force for powering the vehicle.

6. The vehicle of claim 1, wherein said rotatable assembly is configured to rotate independently of the fuselage.

7. The vehicle of claim 1, wherein said thrust assembly further comprises one or more airfoils.

8. The vehicle of claim 7, further comprising means for moving the airfoil between a deployed position, where said airfoil extends outwardly from the thrust assembly, and a retracted position for stowing said airfoil within said thrust assembly.

9. The vehicle of claim 7, further comprising means for adjusting the angle of the airfoil relative to the thrust assembly.

10. The vehicle of claim 1, wherein said thrust assembly comprises
    an outer frame member,
    an inner frame member disposed within the outer frame member, and
    a plurality of support elements spanning between the outer and inner frame members,
    wherein each of said outer and inner frame members and said support members include a fluid passage for centrifugally transferring fuel therethrough to said power sources.

11. The vehicle of claim 10, wherein said rotation decoupling interface assembly comprises a fuel source coupled to the fluid passage for transferring fuel from the fuel source to the power sources.

12. The vehicle of claim 1, wherein the rotatable thrust assembly is disposable between a first position for placing the vehicle in a hover position relative to a geographic location, and a second position for propelling the vehicle in a selected direction.

13. The vehicle of claim 12, wherein the rotatable thrust assembly is pivotably adapted to be disposed between a lift position, where the rotatable thrust assembly lifts the vehicle, and a propulsion position, where the rotatable thrust assembly propels the vehicle.

14. The vehicle of claim 12, wherein the vehicle, when said rotatable thrust assembly is disposed in said first position, is substantially free of horizontal or vertical movement.

15. The vehicle of claim 12, wherein the fuselage is adapted to be movable relative to said rotatable thrust assembly when disposed in said first position or said second position.

16. The vehicle of claim 1, wherein said plurality of power sources are disposed about one of an outer periphery and inner periphery of the rotatable assembly.

17. The vehicle of claim 1, further comprising mean for radially moving one or more of said plurality of power sources relative to said rotatable thrust assembly.

18. The vehicle of claim 1, further comprising means for adjusting the angle of the power sources relative to the thrust assembly.

19. The vehicle of claim 1, wherein each of said power sources has an associated thrust, further comprising thrust variation means for varying an orientation of said thrust relative to said rotatable thrust assembly.

20. The vehicle of claim 1, wherein said power source comprises a jet engine.

21. The vehicle of claim 19, wherein said thrust variation means comprises means for varying an axis of said thrust by varying the position of the power sources.

22. The vehicle of claim 1, wherein said rotation decoupling interface assembly is sized and configured for storing a fuel for said power sources.

23. The vehicle of claim 22, wherein said rotation decoupling interface assembly comprises means for evenly and circumferentially distributing said fuel therein.

24. The vehicle of claim 1, wherein said rotation decoupling interface assembly comprises
    one or more roller bearing assemblies, and
    a fuel tank for storing fuel.

25. The vehicle of claim 24, wherein said rotation decoupling interface assembly comprises two or more roller bearing assemblies, wherein at least one of said roller berg assemblies is coupled To the rotatable thrust assembly, and wherein at least one of the other roller bearing assemblies is coupled to the fuselage.

26. The vehicle of claim 2, wherein said inner frame element comprises means for evenly and circumferentially distributing fuel therein.

27. The vehicle of claim 26, further comprising means for centrifugally transferring said fuel radially outward from said inner frame element to said outer frame element through one or more of said support elements for subsequent delivery to said power sources.

28. The vehicle of claim 1, wherein one of the fuselage and the rotation decoupling interface assembly comprises two or more tilt rods extending outwardly therefrom for supporting said fuselage within the rotation decoupling interface assembly.

29. The vehicle of claim 28, wherein said fuselage is pivotably movable about said tilt rods when coupled to said rotation decoupling interface assembly.

30. The vehicle of claim 28, further comprising means for disconnecting said fuselage from said rotation decoupling interface assembly.

31. The vehicle of claim 28, wherein said fuselage is adapted to tilt relative to said rotatable thrust assembly when coupled to said rotation decoupling interface assembly.

32. The vehicle of claim 1, wherein said fuselage comprises a first fuel storage element for storing fuel for said power sources.

33. The vehicle of claim 32, wherein said rotation decoupling interface assembly comprises a second fuel storage element for storing fuel, and a fuel pump for transferring fuel between the first and second fuel storage elements.

34. The vehicle of claim 1, further comprising means for changing the position of the fuselage relative to the rotatable thrust assembly or the rotation decoupling interface assembly.

35. The vehicle of claim 1, further comprising means for optimizing the position of the fuselage relative to the rotatable thrust assembly.

36. The vehicle of claim 1, wherein the rotatable the assembly generates a single total force having a selected force area for powering the vehicle.

37. The vehicle of claim 36, wherein the single total force has an annular force area.

38. The vehicle of claim 36, wherein the single total force is disposed about the fuselage.

39. The vehicle of claim 38, wherein said single total force is separated from the center of the vehicle.

40. The vehicle of claim 36, wherein the single total force comprises an inner portion separated from the center of gravity of the fuselage by a distance D, and an outer portion separated from the center of gravity of the fuselage by a distance L, such that the ratio L/D is about 10.

41. The vehicle of claim 40, therein the single total force is significantly separated from the center of rotation of the rotatable this assembly.

42. The vehicle of claim 36, further comprising
  an airfoil operably coupled to the thrust assembly for movement between a deployed position, where said airfoil extends outwardly from said thrust assembly, and a retracted position, where the airfoil is slowed within the thrust assembly; and
  means for moving the airfoil between said deployed and retracted positions in a single revolution of the frame elements of the thrust assembly.

43. The vehicle of claim 36, wherein said fuselage comprises one or more airfoils extending outwardly therefrom, said airfoils being adapted to generate a lift force and to stabilize the vehicle during use.

44. The vehicle of claim 36, wherein said thrust assembly and said fuselage are adapted to be scalable.

45. The vehicle of claim 36, wherein said fuselage further comprises a secondary power source for providing a supplemental force.

46. The vehicle of claim 36, further comprising a controller for synchronizing the thrusts generated by each of said plurality of power sources.

47. The vehicle of claim 36, wherein the thrust assembly is disposable between a first position for placing the vehicle in a hover position relative to a geographic location, and a second position for propelling the vehicle in a selected direction.

48. The vehicle of claim 2, further comprising means for adjusting the position of the support elements during use.

49. A vertical rake-off and landing vehicle, comprising
  a fuselage,
  a rotatable thrust assembly circumferentially disposed about the fuselage for generating a force for moving the vehicle,
  a rotation decoupling interface assembly concentrically disposed within the rotatable thrust assembly for mechanically coupling the rotatable thrust assembly to the fuselage without imparting rotational movement thereto,
  a plurality of power sources coupled to one of said rotatable thrust assembly a said rotation decoupling interface assembly for imparting rotational movement thereto, and
  means for radially moving one or, more of said plurality of power sources relative to said rotatable thrust assembly.

50. The vehicle of claim 49, wherein the rotatable thrust assembly comprises a plurality of support elements spanning between an outer frame element and an inner frame element.

51. The vehicle of claim 49, wherein the rotatable thrust assembly is adapted to be circumferentially rotatable about the fuselage.

52. The vehicle of claim 49, wherein the rotatable dust assembly is adapted to be pivotably movable about the fuselage.

53. The vehicle of claim 49, wherein each of said plurality of power sources generates a force to form a plurality of forces, and wherein said rotatable thrust assembly is configured for translating said plurality of forces into a single primary composite force for powering the vehicle.

54. The vehicle of claim 49, wherein said rotatable thrust assembly is configured to rotate independently of the fuselage.

55. The vehicle of claim 49, wherein said thrust assembly further comprises one or more airfoils.

56. The vehicle of claim 55, further comprising means for moving the airfoil between a deployed position, where said airfoil extends outwardly from the thrust assembly, and a retracted position for stowing said airfoil within said thrust assembly.

57. The vehicle of claim 55, further comprising means for adjusting the angle of the airfoil relative to the thrust assembly.

58. The vehicle of claim 49, wherein said thrust assembly comprises
  an outer frame member,
  an inner frame member disposed within the outer frame member, and
  a plurality of support elements spanning between the outer and inner frame members,
  wherein each of said outer and inner frame members and said support members include a fluid passage for centrifugally transferring fuel therethrough to said power sources.

59. The vehicle of claim 58, wherein said rotation decoupling interface assembly comprises a fuel source coupled to the fluid passage for transferring fuel from the fuel source to the power sources.

60. The vehicle of claim 49, wherein she rotatable thrust assembly is disposable between a first position for placing the vehicle in a hover position relative to a geographic location, and a second position for propelling the vehicle in a selected direction.

61. The vehicle of claim 60, wherein the rotatable thrust assembly is pivotably adapted to be disposed between a lift position, where the rotatable thrust assembly lifts the vehicle, and a propulsion position, where the rotatable thrust assembly propels the vehicle.

62. The vehicle of claim 60, wherein the vehicle, when said rotatable thrust assembly is disposed in said first position, is substantially free of horizontal or vertical movement.

63. The vehicle of claim 60, wherein the fuselage is adapted to be movable relative to said rotatable thrust assembly when disposed in said first position or said second position.

64. The vehicle of claim 49, wherein said plurality of power sources are disposed about one of an outer periphery and an inner periphery of the rotatable thrust assembly.

65. The vehicle of claim 49, further comprising means for adjusting the angle of the power sources relative to the thrust assembly.

66. The vehicle of claim 49, wherein each of said power sources has an associated thrust, further comprising thrust variation means for varying an orientation of said thrust relative to said rotatable thru assembly.

67. The vehicle of claim 49, wherein said power source comprises a jet engine.

68. The vehicle of claim 66, wherein said thrust variation means comprises means for varying an axis of said thrust by varying the position of the power sources.

69. The vehicle of claim 49, wherein said rotation decoupling interface assembly is sized and configured for storing a fuel for said power sources.

70. The vehicle of claim 69, wherein said rotation decoupling interface assembly comprises means for evenly and circumferentially distributing said fuel therein.

71. The vehicle of claim 49, wherein said rotation decoupling interface assembly comprises
one or more roller bearing assemblies, and
a fuel tank for storing fuel.

72. The vehicle of claim 71, wherein said rotation decoupling interface assembly comprises two or more roller bearing assemblies, wherein at least one of said roller bearing assemblies is coupled to the rotatable thrust assembly, and wherein at least one of the other roller bearing assemblies is coupled to the fuselage.

73. The vehicle of claim 50, wherein said inner frame element comprises means for evenly and circumferentially distributing fuel therein.

74. The vehicle of claim 73, further comprising means for centrifugally transferring said fuel radially outward from said inner frame element to said outer frame element through one or more of said support elements for subsequent delivery to said power sources.

75. The vehicle of claim 49, wherein one of the fuselage and the rotation decoupling interface assembly comprises two or more tilt rods extending outwardly therefrom for supporting said fuselage within rotation decoupling interface assembly.

76. The vehicle of claim 75, wherein said fuselage is pivotably movable about said tilt rods when coupled to said rotation decoupling interface assembly.

77. The vehicle of claim 75, further comprising means for disconnecting said fuselage from said rotation decoupling interface assembly.

78. The vehicle of claim 75, wherein said fuselage is adapted to tilt relative to said rotatable thrust assembly when coupled to said rotation decoupling interface assembly.

79. The vehicle of claim 49, wherein said fuselage comprises a first fuel storage element for storing fuel for said power sources.

80. The vehicle of claim 79, wherein said rotation decoupling interface assembly comprises a second fuel storage element for storing fuel, and a fuel pump for transferring fuel between the fist and second fuel storage elements.

81. The vehicle of claim 49, further comprising means for changing the position of the fuselage relative to the rotatable thrust assembly or the rotation decoupling interface assembly.

82. The vehicle of claim 49, further comprising means for optimizing the position of the fuselage relative to the rotatable thrust assembly.

83. The vehicle of claim 49, wherein the thrust assembly generates a single total force having a selected force area for powering the vehicle.

84. The vehicle of claim 83, wherein the single total force has an annular force adds.

85. The vehicle of claim 83, wherein the single total force is disposed about the fuselage.

86. The vehicle of claim 85, wherein said single total force is separated from the center of the vehicle.

87. The vehicle of claim 83, wherein the single total force comprises an inner portion separated from the center of gravity of the fuselage by a distance D, and an outer portion separated from the center of gravity of the fuselage by a distance L, such that the ratio L/D is about 10.

88. The vehicle of claim 87, wherein the single total force is significantly separated from the center of rotation of the rotatable thrust assembly.

89. The vehicle of claim 83, further comprising
an airfoil operably coupled to the thrust assembly for movement between a deployed positions where said airfoil extends outwardly from said thrust assembly, and a retracted position, where the airfoil is stowed within the thirst assembly, and
means for moving the airfoil between said deployed an retracted positions in a single revolution of the frame elements of the thrust assembly.

90. The vehicle of claim 83, wherein said fuselage comprises one or more airfoils extending outwardly therefrom, said airfoils being adapted to generate a lift force and to stabilize the vehicle during use.

91. The vehicle of claim 83, wherein said thrust assembly and said fuselage are adapted to be scalable.

92. The vehicle of claim 83, wherein said fuselage further comprises a secondary power source for providing a supplemental force.

93. The vehicle of claim 83, further comprising a controller for synchronizing the thrust generated by each of said plurality of power sources.

94. The vehicle of claim 49, wherein the thrust assembly is disposable between a first position for placing the vehicle in a hover position relative to a geographic location, and a second position for propelling the vehicle in a selected direction.

95. The vehicle of claim 50, further comprising means for adjusting the position of the support elements during use.

96. A vehicle take-off and landing vehicle, comprising
a fuselage, a rotatable thrust assembly circumferentially disposed about the fuselage for generating a force for moving the vehicle, a rotation decoupling interface assembly concentrically disposed within the rotatable thrust assembly for mechanically coupling the rotatable thrust assembly to the fuselage without imparting rotational movement thereto, and a plurality of power sources coupled to one of said rotatable thrust assembly and said rotation decoupling interface assembly for imparting rotational movement thereto, one or more airfoils for controlling said thrust assembly, and means for moving the airfoil between a deployed position, where said airfoil extends outwardly from the thrust assembly, and a retracted position for stowing said airfoil within said thrust assembly.

97. The vehicle of claim 96, wherein the rotatable thrust assembly comprises a plurality of support elements spanning between an outer frame element and an inner frame element.

98. The vehicle of claim 96, wherein the rotatable thrust assembly is adapted to be circumferentially rotatable about the fuselage.

99. The vehicle of claim 96, wherein the rotatable thrust assembly is adapted to be pivotably movable about the fuselage.

100. The vehicle of claim 96, wherein each of said plurality of power sources generates a force to form a plurality of forces, and wherein said rotatable thrust assembly is configured for translating said plurality of forces into a single primary composite force for powering the vehicle.

101. The vehicle of claim 96, wherein said rotatable thrust assembly is configured to rotate independently of the fuselage.

102. The vehicle of claim 101, further comprising means for adjusting the angle of the airfoil relative to the thrust assembly.

103. The vehicle of claim 96, wherein said thrust assembly comprises
an outer frame member,
an inner frame member disposed within the outer frame member, and
a plurality of support elements spanning between the outer and inner frame members,
wherein each of said outer and inner frame members and said support members include a fluid passage for centrifugally transferring fuel therethrough to said power sources.

104. The vehicle of claim 103, wherein said rotation decoupling interface assembly comprises a fuel source coupled to the fluid passage for transferring fuel from fuel source to the power sources.

105. The vehicle of claim 96, wherein the rotatable thrust assembly is disposable between a first position for placing the vehicle in a hover position relative to a geographic location, and a second position for propelling the vehicle in a selected direction.

106. The vehicle of claim 105, wherein the rotatable thrust assembly is pivotably adapted to be disposed between a lift position, where the rotatable thrust assembly lifts the vehicle, and a propulsion position, where the rotatable thrust assembly propels the vehicle.

107. The vehicle of claim 105, wherein the vehicle, when said rotatable thrust assembly is disposed in said first position, is substantially free of horizontal or vertical movement.

108. The vehicle of claim 105, wherein the fuselage is adapted to be movable relative to said rotatable thrust assembly when disposed in said first position or said second position.

109. The vehicle of claim 96, wherein said plurality of power sources are disposed about one of an outer periphery and an inner periphery of the rotatable thrust assembly.

110. The vehicle of claim 96, further comprising means for radially moving one or more of said plurality of power sources relative to said rotatable thrust assembly.

111. The vehicle of claim 96, further comprising means for adjusting the angle of the power sources relative to the thrust assembly.

112. The vehicle of claim 96, wherein each of said power sources has an associated thrust, further comprising thrust variation means for varying an orientation of said thrust relative to said rotatable thrust assembly.

113. The vehicle of claim 96, wherein said power source comprises a jet engine.

114. The vehicle of claim 112, wherein said thrust variation means comprises means for varying an axis of said thrust by varying the position of the power sources.

115. The vehicle of claim 96, wherein said rotation decoupling interface assembly is sized and configured for storing a fuel for said power sources.

116. The vehicle of claim 115, wherein said rotation decoupling interface assembly comprises means for evenly and circumferentially distributing said fuel therein.

117. The vehicle of claim 96, wherein said rotation decoupling interface assembly comprises
one or more roller bearing assemblies, and
a fuel tank for storing fuel.

118. The vehicle of claim 117, wherein said rotation decoupling interface assembly comprises two or more roller bearing assemblies, wherein at least one of said roller bearing assemblies is coupled to the rotatable thrust assembly, and wherein at least one of the other roller bearing assemblies is coupled to the fuselage.

119. The vehicle of claim 97, wherein said inner frame element comprises means for evenly and circumferentially distributing fuel therein.

120. The vehicle of claim 119, further comprising means for centrifugally transferring said fuel radially outward from said inner frame element to said outer frame element through one or more of said support elements for subsequent delivery to said power sources.

121. The vehicle of claim 96, wherein one of the fuselage and the rotation decoupling interface assembly comprises two or more tilt rods extending outwardly therefrom for supporting said fuselage within the rotation decoupling interface assembly.

122. The vehicle of claim 121, wherein said fuselage is pivotably movable about said tilt rods when coupled to said rotation decoupling interface assembly.

123. The vehicle of claim 121, further comprising means for disconnecting said fuselage from said rotation decoupling interface assembly.

124. The vehicle of claim 121, wherein said fuselage is adapted to tilt relative to said rotatable thrust assembly when coupled to said rotation decoupling interface assembly.

125. The vehicle of claim 96, wherein said fuselage comprises a first fuel storage element for storing fuel for said power sources.

126. The vehicle of claim 125, wherein said rotation decoupling interface assembly comprises a second fuel storage element for storing fuel, and a fuel pump for transferring fuel between the first and second fuel storage elements.

127. The vehicle of claim 96, further comprising means for changing the position of the fuselage relative to the rotatable thrust assembly or the rotation decoupling interface assembly.

128. The vehicle of claim 96, further comprising means for optimizing the position of the fuselage relative to the rotatable thrust assembly.

129. The vehicle of claim 96, wherein said rotary interface assembly comprises a plurality of nested rings having bearings disposed therein.

130. The vehicle of claim 96, wherein the rotatable thrust assembly generates a single total force having a selected force area for powering the vehicle.

131. The vehicle of claim 130, wherein the single total force has an annular force area.

132. The vehicle of claim 130, wherein the single total force is disposed about the fuselage.

133. The vehicle of claim 132, wherein said single total force is separated from the center of the vehicle.

134. The vehicle of claim 130, wherein the single total force comprises an inner portion separated from the center of gravity of the fuselage by a distance D, and an outer portion separated from the center of gravity of the fuselage by a distance L, such that the ratio L/D is about 10.

135. The vehicle of claim 134, wherein the single total force is significantly separated from the center of rotation of the rotatable thrust assembly.

136. The vehicle of claim 130, further comprising
an airfoil operably coupled to the thrust assembly for movement between a deployed position, where said airfoil extends outwardly from said thrust assembly, and a retracted position, where the airfoil is stowed within the thrust assembly, and
means for moving the airfoil between said deployed and retracted positions in a single revolution of the frame elements of the thrust assembly.

137. The vehicle of claim 130, wherein said fuselage comprises one or more airfoils extending, outwardly therefrom, said airfoils being adapted to generate a lift force and to stabilize the vehicle during use.

138. The vehicle of claim 130, wherein said thrust assembly and said fuselage are adapted to be scalable.

139. The vehicle of claim 130, wherein said fuselage further comprises a secondary power source for providing a supplemental force.

140. The vehicle of claim 130, further comprising a controller for synchronizing the thrusts generated by each of said plurality of power sources.

141. The vehicle of claim 96, wherein the thrust assembly is disposable between a first position for placing the vehicle in a hover position relative to a geographic location, and a second position for propelling the vehicle in a selected direction.

142. The vehicle of claim 97, further comprising means for adjusting the position of the support elements during use.

143. A vertical take-off and landing vehicle, comprising
a fuselage,
a rotatable thrust assembly circumferentially disposed about the fuselage for generating a force for moving the vehicle,
a rotation decoupling interface assembly concentrically disposed within the rotatable thrust assembly for mechanically coupling the rotatable thrust assembly to the fuselage without imparting rotational movement thereto, and
a plurality of power sources coupled to one of said rotatable thrust assembly and said rotation decoupling interface assembly for imparting rotational movement thereto, wherein at least one of the plurality of power sources is disposed in the rotation decoupling interface assembly.

144. The vehicle of claim 143, wherein the rotatable thrust assembly comprises a plurality of support elements spanning between an outer frame element and an inner frame element.

145. The vehicle of claim 143, wherein the rotatable thrust assembly is adapted to be circumferentially rotatable about the fuselage.

146. The vehicle of claim 143, wherein the rotatable thrust assembly is adapted to be pivotably movable about the fuselage.

147. The vehicle of claim 143, wherein each of said plurality of power sources generates a force to form a plurality of forces, and wherein said rotatable thrust assembly is configured for translating said plurality of forces into a single primary composite force for powering the vehicle.

148. The vehicle of claim 143, wherein said rotatable rust assembly is configured to rotate independently of the fuselage.

149. The vehicle of claim 143, wherein said thrust assembly further comprises one or more airfoils.

150. The vehicle of claim 149, further comprising means for moving the airfoil between a deployed position, where said airfoil extends outwardly from the thrust assembly, and a retracted position for stowing said airfoil within said thrust assembly.

151. The vehicle of claim 149, further comprising means for adjusting the angle of the airfoil relative to the thrust assembly.

152. The vehicle of claim 143, wherein said thrust assembly comprises
an outer frame member,
a inner frame member disposed within the outer frame member, and
a plurality of support elements spanning between the outer and inner frame members,
wherein each of said outer and inner frame members and said support members include a fluid passage for centrifugally transferring fuel therethrough to said power sources.

153. The vehicle of claim 152, wherein said rotation decoupling interface assembly comprises a fuel source coupled to the fluid passage for transferring fuel from the fuel source to the power sources.

154. The vehicle of claim 143, wherein the rotatable thrust assembly is disposable between a first position for placing the vehicle in a hover position relative to a geographic location, and a second position for propelling the vehicle in a selected direction.

155. The vehicle of claim 154, wherein the rotatable thrust assembly is pivotably adapted to be disposed between a lift position, where the rotatable thrust assembly lifts the vehicle, and a propulsion position, where the rotatable thrust assembly propels the vehicle.

156. The vehicle of claim 154, wherein the vehicle, when said rotatable thrust assembly is disposed in said first position, is substantially free of horizontal or vertical movement.

157. The vehicle of claim 154, wherein the fuselage is adapted to be movable relative to said rotatable thrust assembly when disposed in said first position or said second position.

158. The vehicle of claim 143, wherein said plurality of power sources are disposed about one of an outer periphery and an inner periphery of the rotatable thrust assembly.

159. The vehicle of claim 143, further comprising means for radially moving one or more of said plurality of power sources relative to said rotatable thrust assembly.

160. The vehicle of claim 143, further comprising means for adjusting the angle of the power sources relative to the thrust assembly.

161. The vehicle of claim 143, wherein each of said power sources has an associated thrust, further comprising thrust variation means for varying an orientation of said thrust relative to said rotatable thrust assembly.

162. The vehicle of claim 143, wherein said power source comprises a jet engine.

163. The vehicle of claim 161, wherein said thrust variation means comprises means for varying an axis of said dust by varying the position of the power sources.

164. The vehicle of claim 143, wherein said rotation decoupling interface assembly is sized and configured for storing a fuel for said power sources.

165. The vehicle of claim 164, wherein said rotation decoupling interface assembly comprises means for evenly and circumferentially distributing said fuel therein.

166. The vehicle of claim 143, wherein said rotation decoupling interface assembly comprises
one or more roller bearing assemblies, and
a fuel tank for storing fuel.

167. The vehicle of claim 166, wherein said rotation decoupling interface assembly comprises two or more roller bearing assemblies, wherein at least one of said roller bearing assemblies is coupled to the rotatable thrust assembly, and wherein at least one of the other roller bearing assemblies is coupled to the fuselage.

168. The vehicle of claim 144, wherein said inner frame element comprises means for evenly and circumferentially distributing fuel therein.

169. The vehicle of claim 168, further comprising means for centrifugally transferring said fuel radially outward from said inner fine element to said outer frame element through one or more of said support elements for subsequent delivery to said power sources.

170. The vehicle of claim 143, wherein the fuselage comprises one or more direction control elements operable for controlling the direction of the vehicle.

171. The vehicle of claim 143, wherein one of the fuselage and the rotation decoupling interface assembly comprises two or more tilt rods extending outwardly therefrom for supporting said fuselage within the rotation decoupling interface assembly.

172. The vehicle of claim 171, wherein said fuselage is pivotably movable about said tilt rods when coupled to said rotation decoupling interface assembly.

173. The vehicle of claim 171, further comprising means for disconnecting said fuselage from said rotation decoupling interface assembly.

174. The vehicle of claim 171, wherein said fuselage is adapted to tilt relative to said rotatable thrust assembly when coupled to said rotation decoupling interface assembly.

175. The vehicle of claim 143, wherein said fuselage comprises a first fuel storage element for storing fuel for said power sources.

176. The vehicle of claim 175, wherein said rotation decoupling interface assembly comprises a second fuel storage element for storing fuel, and a fuel pump for transferring fuel between the first and second fuel storage elements.

177. The vehicle of claim 143, further comprising means for changing the position of the fuselage relative to the rotatable thrust assembly or the rotation decoupling interface assembly.

178. The vehicle of claim 143, further comprising means for optimizing the position of the fuselage relative to the rotatable thrust assembly.

179. The vehicle of claim 143, wherein said rotary interface assembly comprises a plurality of nested rings having beings disposed therein.

180. The vehicle of claim 143, wherein the rotatable thrust assembly generates a single total force having a selected force area for powering the vehicle.

181. The vehicle of claim 180, wherein the single total force has an annular force area.

182. The vehicle of claim 180, wherein the single total force is disposed about the fuselage.

183. The vehicle of claim 182, wherein said single total force is separated from the center of the vehicle.

184. The vehicle of claim 180, wherein the single total force comprises an inner portion separated from the center of gravity of the fuselage by a distance D, and an outer portion separated from the center of gravity of the fuselage by a distance L, such that the ratio L/D is about 10.

185. The vehicle of claim 184, wherein the single tool force is significantly separated from the center of rotation of the rotatable thrust assembly.

186. The vehicle of claim 180, further comprising
an airfoil operably coupled to the thrust assembly for movement between a deployed position, where said airfoil extends outwardly from said thrust assembly, and a retracted position, where the airfoil is stowed within thrust assembly, and
means for moving the airfoil between said deployed and retracted positions in a single revolution of the frame elements of the thrust assembly.

187. The vehicle of claim 180, wherein said fuselage comprises one or more airfoils extending outwardly therefrom, said airfoils being adapted to generate a lift force and to stabilize the vehicle during use.

188. The vehicle of claim 180, wherein said assembly and said fuselage are adapted to be scalable.

189. The vehicle of claim 180, wherein said fuselage further comprises a secondary power source for providing a supplemental force.

190. The vehicle of claim 180, further comprising a controller for synchronizing the thrusts generated by each of said plurality of power sources.

191. The vehicle of claim 143, wherein the thrust assembly is disposable between a first position for placing the vehicle in a hover position relative to a geographic location, and a second position for propelling the vehicle in a selected direction.

192. The vehicle of claim 144, further comprising means for adjusting the position of the support elements during use.

193. A vertical take-off and landing vehicle, comprising
a fuselage,
a rotatable thrust assembly circumferentially disposed about the fuselage for generating a force for moving the vehicle,
a rotation decoupling interface assembly concentrically disposed within the rotatable thrust assembly for mechanically coupling the rotatable thrust assembly to the fuselage without imparting rotational movement thereto, and
a plurality of power sources coupled to one of said rotatable thrust assembly and said rotation decoupling interface assembly for imparting rotational movement thereto, wherein said thrust assembly is tiltable by rotation about an axis of the fuselage.

194. The vehicle of claim 193, wherein the rotatable thrust assembly comprises a plurality of suppose elements spanning between an outer frame element and an inner frame element.

195. The vehicle of claim 193, wherein the rotatable thrust assembly is adapted to be circumferentially rotatable about the fuselage.

196. The vehicle of claim 193, wherein the rotatable thrust assembly is adapted to be pivotably movable about the fuselage.

197. The vehicle of claim 193, wherein each of said plurality of power sources generates a force to form a plurality of forces, and wherein said rotatable thrust assembly is configured for translating said plurality of forces into a single primary composite force for powering the vehicle.

198. The vehicle of claim 193, wherein said rotatable thrust assembly is configured to rotate independently of the fuselage.

199. The vehicle of claim 193, wherein said thrust assembly further comprises one or more airfoils.

200. The vehicle of claim 199, further comprising means for moving the airfoil between a deployed position, where said airfoil extends outwardly from the thrust assembly, and a reacted position for stowing said foil within said thrust assembly.

201. The vehicle of claim 199, further comprising means for adjusting the angle of the airfoil relative to the thrust assembly.

202. The vehicle of claim 193, wherein said thrust assembly comprises
an outer frame member,
an inner frame member disposed within the outer frame member, and
a plurality of support elements spanning between the outer and inner frame members,
wherein each of said outer and inner frame members and said support members include a fluid passage for centrifugally transferring fuel therethrough to said power sources.

203. The vehicle of claim 202, wherein said rotation decoupling interface assembly comprises a fuel source coupled to the fluid passage for transferring fuel from the fuel source to the power sources.

204. The vehicle of claim 193, wherein the rotatable thrust assembly is disposable between a first position for placing the vehicle in a hover position relative to a geographic location, and a second position for propelling the vehicle in a selected direction.

205. The vehicle of claim 204, wherein the rotatable thrust assembly is pivotably adapted to be disposed between a lift position, where the rotatable thrust assembly lifts the vehicle, and a propulsion position, where the rotatable thrust assembly propels the vehicle.

206. The vehicle of claim 204, wherein the vehicle, when said rotatable thrust assembly is disposed in said first position, is substantially free of horizontal or vertical movement.

207. The vehicle of claim 204, wherein the fuselage is adapted to be movable relative to said rotatable thrust assembly when disposed in said first position or said second position.

208. The vehicle of claim 193, wherein said plurality of power sources are disposed about one of an outer periphery and an inner periphery of the rotatable thrust assembly.

209. The vehicle of claim 193, further comprising means for radially moving one or more of said plurality of power sources relative to said rotatable thrust assembly.

210. The vehicle of claim 193, further comprising means for adjusting the angle of the power sources relative to the thrust assembly.

211. The vehicle of claim 193, wherein each of said power sources has an associated thrust, further comprising thrust variation means for varying an orientation of said thrust relative to said rotatable thrust assembly.

212. The vehicle of claim 193, wherein said power source comprises a jet engine.

213. The vehicle of claim 211, wherein said thrust variation means comprises means for varying an axis of said thrust by varying the position of the power sources.

214. The vehicle of claim 193, wherein said rotation decoupling interface assembly is sized and configured for storing a fuel for said power sources.

215. The vehicle of claim 214, wherein said rotation decoupling interface assembly comprises means for evenly and circumferentially distributing said fuel herein.

216. The vehicle of claim 193, wherein said rotation decoupling interface assembly comprises
one or more roller bearing assemblies, and
a fuel tank for storing fuel.

217. The vehicle of claim 216, wherein said rotation decoupling interface assembly comprises two or more roller bearing assemblies, wherein at least one of said roller bearing assemblies is coupled to the rotatable thrust assembly, and wherein at least one of the other roller bearing assemblies is coupled to the fuselage.

218. The vehicle of claim 194, wherein said inner frame element comprises means for evenly and circumferentially distributing fuel therein.

219. The vehicle of claim 218, further comprising means for centrifugally transferring said fuel radially outward from said inner frame element to said outer frame element through one or more of said support elements for subsequent delivery to said power sources.

220. The vehicle of claim 193, wherein one of the fuselage and the rotation decoupling interface assembly comprises two or more tilt rods extending outwardly therefrom for supporting said fuselage within the rotation decoupling interface assembly.

221. The vehicle of claim 220, wherein said fuselage is pivotably movable about said tilt rods when coupled to said rotation decoupling interface assembly.

222. The vehicle of claim 220, further comprising means for disconnecting said fuselage from said rotation decoupling interface assembly.

223. The vehicle of claim 220, wherein said fuselage is adapted to tilt relative to said rotatable thrust assembly when coupled to said rotation decoupling interface assembly.

224. The vehicle of claim 193, wherein said fuselage comprises a first fuel storage element for storing fuel for said power sources.

225. The vehicle of claim 224, wherein said rotation decoupling interface assembly comprises a second fuel storage element for storing fuel, and a fuel pump for transferring fuel between the first and second fuel storage elements.

226. The vehicle of claim 193, further comprising means for changing the position of the fuselage relative to the rotatable thrust assembly or the rotation decoupling interface assembly.

227. The vehicle of claim 193, comprising means for optimizing the position of the fuselage relative to the rotatable thrust assembly.

228. The vehicle of claim 193, wherein said rotary interface assembly comprises a plurality of nested rings having bearings disposed therein.

229. The vehicle of claim 193, wherein the rotatable thrust assembly generates a single total force having a selected force area for powering the vehicle.

230. The vehicle of claim 229, wherein the single total force has an annular force area.

231. The vehicle of claim 229, wherein the single total force is disposed about the fuselage.

232. The vehicle of claim 231, wherein said single total force is separated from the center of the vehicle.

233. The vehicle of claim 229, wherein the single total force comprises an inner portion separated from the center of gravity of the fuselage by a distance D, and an outer portion separated from the center of gravity of the fuselage by a distance L, such that the ratio L/D is about 10.

234. The vehicle of claim 233, wherein the single total force is significantly separated from the center of rotation of the rotatable thrust assembly.

235. The vehicle of claim 229, further comprising
an airfoil operably coupled to the thrust assembly for movement between a deployed position, where said airfoil extends outwardly from said thrust assembly, and a retracted position, where the airfoil is stowed within the thrust assembly, and
means for moving the airfoil between said deployed and retracted positions in a single revolution of the frame elements of the thrust assembly.

236. The vehicle of claim 229, wherein said fuselage comprises one or more airfoils extending outwardly therefrom, said airfoils being adapted to generate a lift force and to stabilize the vehicle during use.

237. The vehicle of claim 229, wherein said thrust assembly and said fuselage are adapted to be scalable.

238. The vehicle of claim 229, wherein said fuselage further comprises a secondary power source for providing a supplemental force.

239. The vehicle of claim 229, further comprising a controller for synchronizing the thrust generated by each of said plurality of power sources.

240. The vehicle of claim 193, wherein the thrust assembly is disposable between a first position for placing the vehicle in a hover position relative to a geographic location and a second position for propelling the vehicle in a selected direction.

241. The vehicle of claim 194, further comprising means for adjusting the position of the support elements during use.

242. A vertical take-off and landing vehicle, comprising
a fuselage,
a rotatable thrust assembly circumferentially disposed about the fuselage for generating a force for moving the vehicle,
a rotation decoupling interface assembly concentrically disposed within the rotatable thrust assembly for mechanically coupling the rotatable thrust assembly to the fuselage without imparting rotational movement thereto, and
a plurality of power sources coupled to one of said rotatable thrust assembly and said rotation decoupling interface assembly for imparting rotational movement thereto, wherein the rotation decoupling interface assembly includes a housing portion defining a fuel tank for storing fuel for the power sources.

243. The vehicle of claim 242, wherein the rotatable thrust assembly comprises a plurality of support elements spanning between an outer frame element and an inner frame element.

244. The vehicle of claim 242, wherein the rotatable thrust assembly is adapted to be circumferentially rotatable about the fuselage.

245. The vehicle of claim 242, wherein the rotatable thrust assembly is adapted to be pivotably movable about the fuselage.

246. The vehicle of claim 242, wherein each of said plurality of power sources generates a force to form a plurality of forces, and wherein said rotatable thrust assembly is configured for translating said plurality of forces into a single primary composite force for powering the vehicle.

247. The vehicle of claim 242, wherein said rotatable thrust assembly is configured to rotate independently of the fuselage.

248. The vehicle of claim 242, wherein said thrust assembly further comprises one or more airfoils.

249. The vehicle of claim 248, further comprising means for moving the airfoil between a deployed position, where said airfoil extends outwardly from the thrust assembly, and a refracted position for stowing said airfoil within said thrust assembly.

250. The vehicle of claim 248, further comprising means for adjusting the angle of the airfoil relative to the thrust assembly.

251. The vehicle of claim 242, wherein said thrust assembly comprises
an outer frame member,
an inner frame member disposed within the outer frame member, and
a plurality of support elements spanning between the outer and inner frame members,
wherein each of said outer and inner frame members and said support members include a fluid passage for centrifugally transferring fuel therethrough to said power sources.

252. The vehicle of claim 251, wherein said rotation decoupling interface assembly comprises a fuel source coupled to the fluid passage for transferring fuel from the fuel source to the power sources.

253. The vehicle of claim 242, wherein the rotatable thrust assembly is disposable between a first position for placing the vehicle in a hover position relative to a geographic location, and a second position for propelling the vehicle in a selected direction.

254. The vehicle of claim 253, wherein the rotatable thrust assembly is pivotably adapted to be disposed between a lift position, where the rotatable thrust assembly lifts the vehicle, and a propulsion position, where the rotatable thrust assembly propels the vehicle.

255. The vehicle of claim 253, wherein the vehicle, when said rotatable thrust assembly is disposed in said first position, is substantially free of horizontal or vertical movement.

256. The vehicle of claim 253, wherein the fuselage is adapted to be movable relative to said rotatable thrust assembly when disposed in said first position or said second position.

257. The vehicle of claim 242, wherein said plurality of power sources are disposed about one of an outer periphery and an inner periphery of the rotatable thrust assembly.

258. The vehicle of claim 242, further comprising means for radially moving one or more of said plurality of power sources relative to said rotatable thrust assembly.

259. The vehicle of claim 242, further comprising means for adjusting the angle of the power sources relative to the thrust assembly.

260. The vehicle of claim 242, wherein each of said power sources has an associated thrust, further comprising thrust variation means for varying an orientation of said thrust relative to said rotatable thrust assembly.

261. The vehicle of claim 242, wherein said power source comprises a jet engine.

262. The vehicle of claim 260, wherein said thrust variation means comprises means for varying an axis of said thrust by varying the position of the power sources.

263. The vehicle of claim 242, wherein said rotation decoupling interface assembly is sized and configured for storing a fuel for said power sources.

264. The vehicle of claim 263, wherein said rotation decoupling interface assembly comprises means for evenly and circumferentially distributing said fuel therein.

265. The vehicle of claim 242, wherein said rotation decoupling interface assembly comprises
one or more roller bearing assemblies, and
a fuel tank for storing fuel.

266. The vehicle of claim 265, wherein said rotation decoupling interface assembly comprises two or more roller bearing assemblies, wherein at least one of said roller bearing assemblies is coupled to the rotatable thrust assembly, and wherein at least one of the other roller bearing assemblies is coupled to the fuselage.

267. The vehicle of claim 243, wherein said inner frame element comprises means for evenly and circumferentially distributing fuel therein.

268. The vehicle of claim 267, further comprising means for centrifugally transferring said fuel radially outward from said inner frame element to said outer frame element through one or more of said support elements for subsequent delivery to said power sources.

269. The vehicle of claim 242, wherein one of the fuselage and the rotation decoupling interface assembly comprises two or more tilt rods extending outwardly therefrom for supporting said fuselage within the rotation decoupling interface assembly.

270. The vehicle of claim 269, wherein said fuselage is pivotably movable about said tilt rods when coupled to said rotation decoupling interface assembly.

271. The vehicle of claim 269, further comprising means for disconnecting said fuselage from said rotation decoupling interface assembly.

272. The vehicle of claim 269, wherein said fuselage is adapted to tilt relative to said rotatable thrust assembly when coupled to said rotation decoupling interface assembly.

273. The vehicle of claim 242, wherein said fuselage comprises a first fuel storage element for storing fuel for said power sources.

274. The vehicle of claim 273, wherein said rotation decoupling interface assembly comprises a second fuel storage element for storing fuel, and a fuel pump for transferring fuel between the first and second fuel storage elements.

275. The vehicle of claim 242, further comprising means for changing the position of the fuselage relative to the rotatable thrust assembly or the rotation decoupling interface assembly.

276. The vehicle of claim 242, further comprising means for optimizing the position of the fuselage relative to the rotatable thrust assembly.

277. The vehicle of 242, wherein the rotatable thrust assembly generates a single total force having a selected force area for powering the vehicle.

278. The vehicle of claim 277, wherein the single total force has an annular force area.

279. The vehicle of claim 277, wherein the single total force is disposed about the fuselage.

280. The vehicle of claim 279, wherein said single total force is separated from the center of he vehicle.

281. The vehicle of claim 277, wherein the single total force comprises an inner portion separated from the center of gravity of the fuselage by a distance D, and an outer portion separated from the center of gravity of the fuselage by a distance L, such that the ratio L/D is about 10.

282. The vehicle of claim 281, wherein the single total force is significantly separated from the center of rotation of the rotatable thrust assembly.

283. The vehicle of claim 277, further comprising an airfoil operably coupled to the thrust assembly for movement between a deployed position, where said airfoil extends outwardly from said thrust assembly, and a retracted position, where the airfoil is stowed within the thrust assembly.

284. The vehicle of claim 283, further comprising means for moving the airfoil between said deployed and retracted positions in a single revolution of the frame elements of the thrust assembly.

285. The vehicle of claim 277, wherein said fuselage comprises one or more airfoils extending outwardly therefrom, said airfoils being adapted to generate a lift force and to stabilize the vehicle during use.

286. The vehicle of claim 277, wherein said thrust assembly and said fuselage are adapted to be scalable.

287. The vehicle of claim 277, wherein said fuselage further comprises a secondary power source for providing a supplemental force.

288. The vehicle of claim 277, further comprising a controller for synchronizing the thrusts generated by each of said plurality of power sources.

289. The vehicle of claim 242, wherein the assembly is disposable between a first position for placing the vehicle in a hover position relative to a geographic location and a second position for propelling the vehicle in a selected direction.

290. The vehicle of claim 243, further comprising means for adjusting the position of the support elements during use.

* * * * *